United States Patent
Newville et al.

(10) Patent No.: US 11,287,080 B2
(45) Date of Patent: Mar. 29, 2022

(54) MULTIDIRECTIONAL DISPLAY MOUNT

(71) Applicant: Manehu Product Alliance, LLC, Carlsbad, CA (US)

(72) Inventors: Brian Newville, San Diego, CA (US); Lee Marc, Carlsbad, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 0 days.

(21) Appl. No.: 17/173,116

(22) Filed: Feb. 10, 2021

(65) Prior Publication Data
US 2021/0247019 A1  Aug. 12, 2021

Related U.S. Application Data

(60) Provisional application No. 62/972,643, filed on Feb. 10, 2020.

(51) Int. Cl.
*F16M 11/08* (2006.01)
*F16M 11/10* (2006.01)
*F16M 11/12* (2006.01)

(52) U.S. Cl.
CPC .......... *F16M 11/121* (2013.01); *F16M 11/08* (2013.01); *F16M 11/10* (2013.01)

(58) Field of Classification Search
USPC ....... 248/123.11, 123.2, 124.1, 125.1, 125.2, 248/162.1, 416, 419, 421, 917, 918, 919, 248/920, 320, 325, 327, 328, 329, 331, 248/280.11, 281.11, 282.1, 283.1, 286.1, 248/287.1
See application file for complete search history.

(56) References Cited

U.S. PATENT DOCUMENTS

| 2,090,439 A | 8/1937 | Carwardine |
| 2,630,854 A | 3/1953 | Neher |
| 4,076,351 A | 2/1978 | Wvant |
| 4,082,244 A | 4/1978 | Groff |

(Continued)

FOREIGN PATENT DOCUMENTS

| CA | 3073367 A1 | 3/2019 |
| CN | 111031859 A | 4/2020 |

(Continued)

OTHER PUBLICATIONS

ISA, International Search Report and Written Opinion for International Application No. PCT/IB2018/57591. dated Jan. 29, 2019.

(Continued)

*Primary Examiner* — Alfred J Wujciak
(74) *Attorney, Agent, or Firm* — Perkins Coie LLP

(57) ABSTRACT

A mounting system capable of mounting objects to support structures is disclosed. The mounting system includes a wall mount including a display bracket configured to hold the object, a fixed support bracket couplable to a vertical support structure, and a linkage assembly. The linkage assembly has a low-profile stowed configuration in which the object is held in a raised position close to the support structure. The linkage assembly moves to another configuration to move the object. The object can be held in a lowered position. A biasing mechanism can facilitate convenient movement of the object.

20 Claims, 22 Drawing Sheets

(56) References Cited

U.S. PATENT DOCUMENTS

| | | | |
|---|---|---|---|
| 4,561,674 A | 12/1985 | Alessio | |
| 4,691,886 A | 9/1987 | Wendlinq | |
| 5,037,054 A | 8/1991 | McConnell | |
| 5,108,063 A | 4/1992 | Koerber, Sr. et al. | |
| 5,135,191 A * | 8/1992 | Schmuhl | A61G 1/04 248/125.1 |
| 5,224,677 A | 7/1993 | Close | |
| 5,299,993 A | 4/1994 | Habinq | |
| 5,499,956 A | 3/1996 | Habinq | |
| 5,560,501 A | 10/1996 | Rupert | |
| 5,738,316 A | 4/1998 | Sweere | |
| 5,743,503 A | 4/1998 | Voeller et al. | |
| 5,826,846 A | 10/1998 | Buccieri et al. | |
| 5,857,756 A | 1/1999 | Fehre | |
| 5,876,008 A | 3/1999 | Sweere | |
| 6,065,725 A | 5/2000 | Mason | |
| 6,065,909 A | 5/2000 | Cook | |
| 6,105,909 A | 8/2000 | Wirth et al. | |
| 6,419,196 B1 | 7/2002 | Sweere | |
| 6,523,796 B2 | 2/2003 | Abramaowskv | |
| 6,592,090 B1 | 7/2003 | Li | |
| 6,695,274 B1 | 2/2004 | Chiu | |
| 6,889,404 B2 | 5/2005 | Lu | |
| 6,905,101 B1 | 6/2005 | Dittmer | |
| 6,983,917 B2 | 1/2006 | Oddsen, Jr. | |
| 7,014,157 B2 | 3/2006 | Oddsen | |
| 7,061,753 B2 | 6/2006 | Michoux et al. | |
| 7,252,277 B2 | 8/2007 | Sweere | |
| 7,290,744 B2 | 11/2007 | Baldasari | |
| 7,300,029 B2 | 11/2007 | Petrick | |
| 7,314,200 B2 * | 1/2008 | Bally | A61G 5/10 248/122.1 |
| 7,395,996 B2 | 7/2008 | Dittmer | |
| 7,398,950 B2 | 7/2008 | Hung | |
| 7,448,584 B2 | 11/2008 | Chen et al. | |
| 7,546,745 B2 | 6/2009 | Lee | |
| 7,546,994 B2 | 6/2009 | Altonji et al. | |
| 7,663,868 B1 | 2/2010 | Lam | |
| 7,854,415 B2 | 12/2010 | Holbrook et al. | |
| 7,866,622 B2 | 1/2011 | Dittmer | |
| 7,950,613 B2 | 5/2011 | Anderson et al. | |
| 8,006,440 B2 | 8/2011 | Thomas et al. | |
| 8,074,950 B2 | 12/2011 | Clarv | |
| 8,094,438 B2 | 1/2012 | Dittmer et al. | |
| 8,382,052 B1 | 2/2013 | Mathieson et al. | |
| 8,724,037 B1 | 5/2014 | Massey | |
| 8,740,164 B2 | 6/2014 | Tachibana | |
| 8,864,092 B2 | 10/2014 | Newville | |
| 8,960,632 B2 | 2/2015 | Fallows | |
| 9,004,430 B2 | 4/2015 | Conner | |
| 9,016,648 B2 | 4/2015 | Smeenk | |
| 9,265,346 B1 | 2/2016 | Forney | |
| 9,433,293 B2 * | 9/2016 | Gross | F16M 13/02 |
| 9,625,091 B1 | 4/2017 | Massey | |
| 9,876,984 B2 | 1/2018 | Massey | |
| 10,139,045 B1 | 11/2018 | Keuter | |
| 10,257,460 B2 | 4/2019 | Massey | |
| 10,277,860 B2 | 4/2019 | Massey | |
| 10,281,080 B1 | 5/2019 | Massey | |
| 10,738,941 B2 * | 8/2020 | Newville | F16M 11/2021 |
| 10,859,201 B2 | 12/2020 | Newville | |
| 10,935,180 B1 | 3/2021 | Massey | |
| 2002/0043978 A1 | 4/2002 | McDonald | |
| 2002/0100851 A1 | 8/2002 | Abramaowsky | |
| 2002/0179791 A1 | 12/2002 | Kwon | |
| 2004/0084587 A1 | 5/2004 | Oddsen | |
| 2005/0010911 A1 | 1/2005 | Kim et al. | |
| 2005/0110911 A1 | 5/2005 | Childrey et al. | |
| 2005/0152102 A1 | 7/2005 | Shin | |
| 2005/0204645 A1 | 9/2005 | Bachinski | |
| 2005/0236543 A1 | 10/2005 | O'Neil | |
| 2006/0070210 A1 | 4/2006 | Amdahl | |
| 2006/0077622 A1 | 4/2006 | Keely et al. | |
| 2006/0102819 A1 | 5/2006 | Li | |
| 2007/0023599 A1 | 2/2007 | Fedewa | |
| 2007/0030405 A1 | 2/2007 | Childrey et al. | |
| 2007/0040084 A1 | 2/2007 | Sturman et al. | |
| 2007/0205340 A1 | 9/2007 | Jung | |
| 2007/0221807 A1 | 9/2007 | Park | |
| 2007/0252056 A1 | 11/2007 | Novin | |
| 2008/0078906 A1 | 4/2008 | Hung | |
| 2008/0237424 A1 | 10/2008 | Clary | |
| 2009/0034178 A1 | 2/2009 | Le | |
| 2009/0050763 A1 | 2/2009 | Dittmer | |
| 2009/0108158 A1 | 4/2009 | Kim et al. | |
| 2009/0179133 A1 | 7/2009 | Gan et al. | |
| 2009/0206221 A1 | 8/2009 | Timm et al. | |
| 2009/0212669 A1 | 8/2009 | Robert-Reitman et al. | |
| 2010/0006725 A1 | 1/2010 | Kim et al. | |
| 2010/0091438 A1 | 4/2010 | Dittmer | |
| 2010/0149736 A1 | 6/2010 | Zhang et al. | |
| 2010/0155558 A1 | 6/2010 | Zhang et al. | |
| 2010/0171013 A1 | 7/2010 | Anderson et al. | |
| 2011/0043978 A1 | 2/2011 | Bremmon et al. | |
| 2011/0234926 A1 | 9/2011 | Smith | |
| 2012/0032062 A1 | 2/2012 | Newville | |
| 2012/0061543 A1 | 3/2012 | Juan | |
| 2012/0167486 A1 | 7/2012 | Lee | |
| 2013/0176667 A1 | 7/2013 | Kulkarni et al. | |
| 2013/0187019 A1 | 7/2013 | Dittmer et al. | |
| 2013/0320163 A1 | 12/2013 | Wong | |
| 2014/0211100 A1 | 7/2014 | Massey | |
| 2015/0277214 A1 | 10/2015 | Schuh | |
| 2017/0105529 A1 | 4/2017 | Kozlowski, Jr. et al. | |
| 2018/0054156 A1 | 2/2018 | Lokey | |
| 2018/0131895 A1 | 5/2018 | Massey | |
| 2018/0352189 A1 | 12/2018 | Massey | |
| 2019/0072231 A1 | 3/2019 | Newville et al. | |
| 2019/0335135 A1 | 10/2019 | Massey | |
| 2020/0408353 A1 | 12/2020 | Massey | |
| 2021/0190259 A1 | 6/2021 | Newville | |

FOREIGN PATENT DOCUMENTS

| | | |
|---|---|---|
| CN | 109605346 B | 8/2020 |
| GB | 2222939 | 3/1990 |
| GB | 2579974 A | 7/2020 |
| KR | 20070081731 A | 8/2007 |
| WO | 2019043670 | 3/2019 |
| WO | 2021127552 A1 | 6/2021 |

OTHER PUBLICATIONS

ISA, International Preliminary Report on Patentability for International Application No. PCT/IB2018/57591. dated Mar. 10, 2020.

* cited by examiner

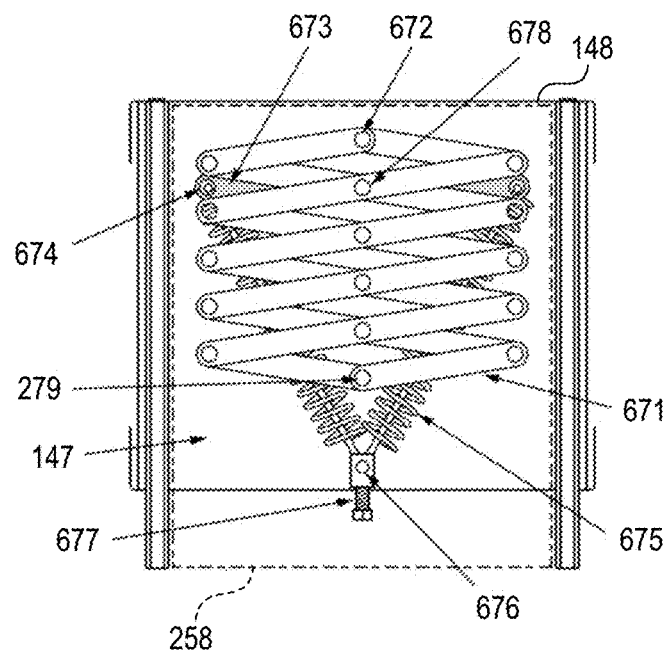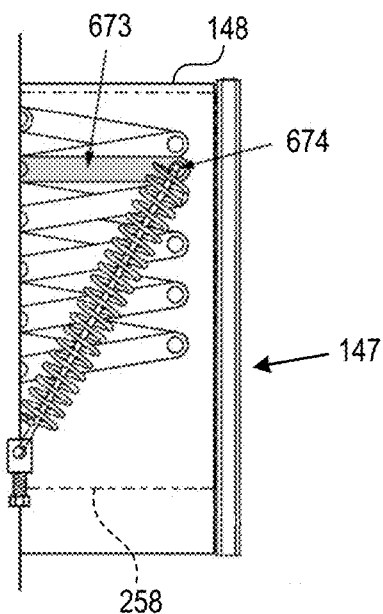
*FIG. 24*  *FIG. 25*
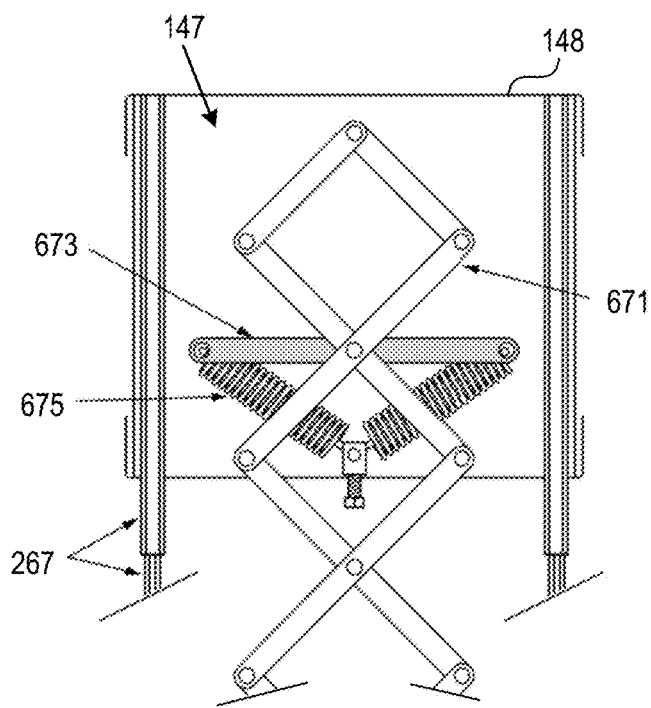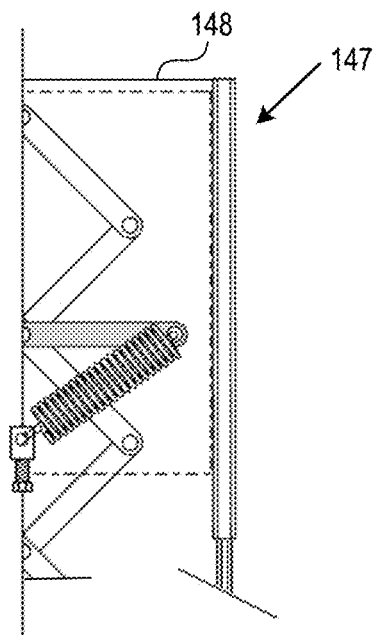
*FIG. 26*  *FIG. 27*

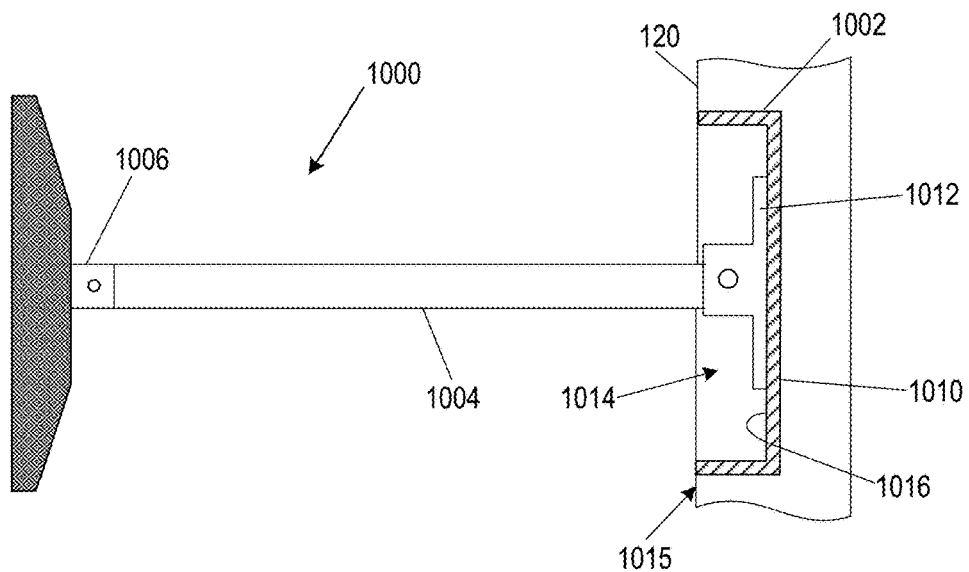
*FIG. 40*
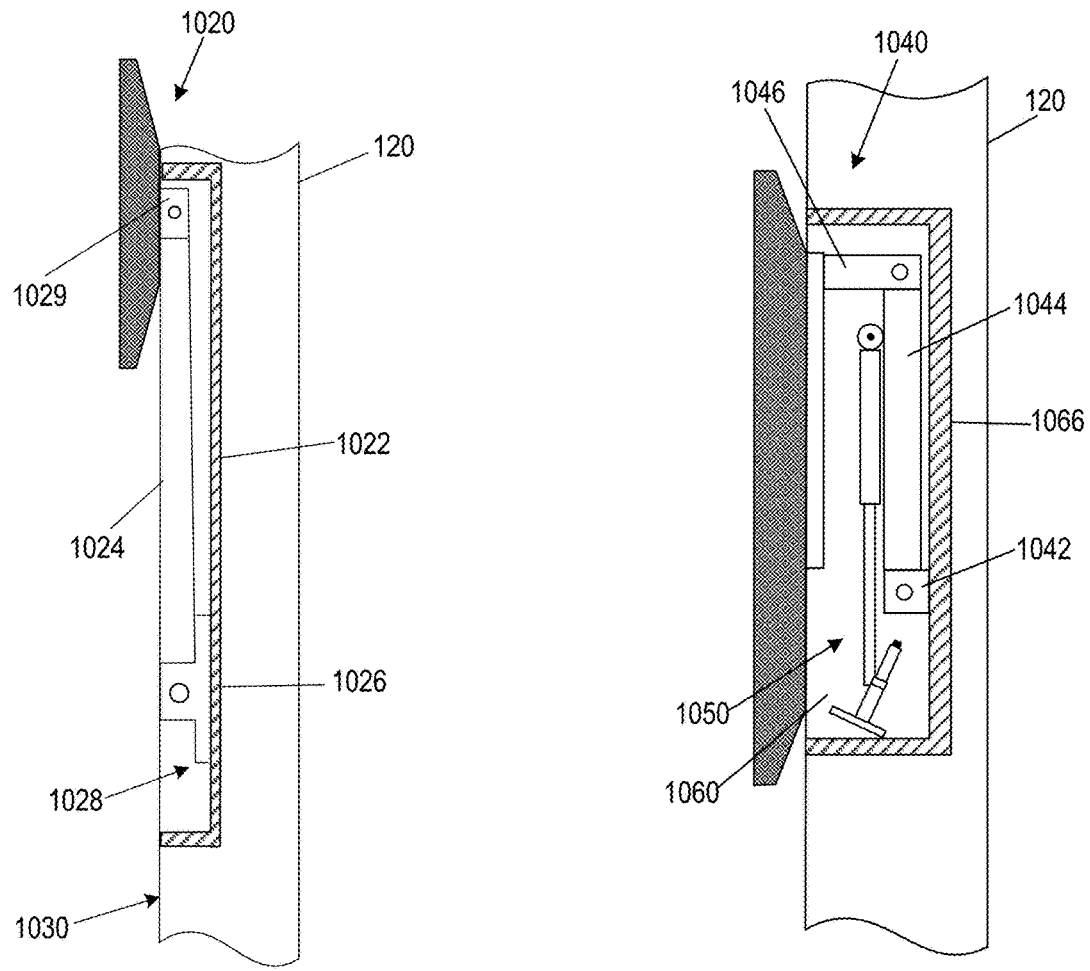
*FIG. 41*
*FIG. 42*

MULTIDIRECTIONAL DISPLAY MOUNT

CROSS-REFERENCE TO RELATED APPLICATION

The present application claims the benefit under 35 U.S.C. § 119(e) of U.S. Provisional Patent Application No. 62/972,643, filed Feb. 10, 2020, which is incorporated herein by reference in its entirety.

TECHNICAL FIELD

The present invention relates generally to mounting systems. More specifically, the invention relates to multidirectional display mounts for mounting televisions to structures.

BACKGROUND

Televisions are often mounted directly to walls using wall mounts. Tilting wall mounts and horizontal motion wall mounts are two types of mounts that allow movement of the television. Tilting wall mounts often allow tilting about a horizontal axis of rotation. Unfortunately, if tilting wall mounts are installed at relatively high locations, there may be limited viewing because ideal viewing often requires that the center of the screen be level with a viewer's eyes. Horizontal motion wall mounts often allow movement of the television away from walls, swiveling of the television, and/or tilting of the television. If either a tilting wall mount or a horizontal motion wall mount is installed above a fireplace, the mounted television is often much higher than a sitting viewer's eyes and, thus, may not provide comfortable viewing.

BRIEF SUMMARY

At least some embodiments are directed to mounts capable of holding and moving objects. Mounted objects can be held at relatively high locations to keep the objects out of the way when stowed. Mounted objects can be conveniently moved to a desired position.

In certain embodiments, a wall mount can hold an electronic display in the form of a television. The wall mount can be installed above a fireplace or other aesthetically pleasing location. A user can manually or automatically lower the television such that the television is generally in front of the fireplace. A viewer's eyes can be generally level with the center of the screen. The television can be panned, tilted (e.g., rotated about a generally horizontal axis), and/or swiveled (e.g., rotated about a generally vertical axis) to accommodate different viewing positions. Pivots, swivels (e.g., swivel brackets), joints, auto-positioning, or the like can be used to provide the desired motion. The television can range in weight from, for example, about 20 pounds to about 110 pounds.

A mounting system, in some embodiments, comprises a multi-direction wall mount including a bracket configured to hold an object, a fixed support bracket couplable to a vertical support structure, and a multi-directional displacement apparatus. The displacement apparatus is movable to an expanded configuration and allows positioning of the object at different heights, viewing angles, and/or lateral positions. A biasing mechanism can facilitate movement of the object and, in some embodiments, can be in the form of a counterbalance mechanism. The counterbalance mechanism can facilitate manual movement of the object. In some embodiments, the displacement apparatus allows the object to be moved away from a raised position toward a lowered position along a path (e.g., a linear path, a multi-segment linear path, an arcuate path, a partially circular path, a curved path, a partially elliptical path, or the like).

In some embodiments, a television mounting device includes a wall mounting portion, a television mounting portion, and an extender assembly. The television mounting portion can be configured to carry a display or television. The extender assembly can be coupled to the wall mounting portion and is configured to move the television mounting portion away from and toward a wall (e.g., a vertical wall) to which the wall mounting portion is coupled. In some embodiments, the television mount device further includes a vertical positioner mechanism coupled to the extender assembly. The vertical positioner mechanism is configured to vertically move the television mounting portion independent of operation of the extender assembly and to move the television mounting portion lower than the wall mounting portion. In some embodiments, the television mounting device is configured for multi-stage deployment in which only translation in one or more directions within a single plane is provided for each stage. For example, the television can be moved horizontally in a first stage and vertically in a second stage.

The extender assembly and the vertical positioner mechanism allow the television mounting portion to be independently moved, including translated in the horizontal direction, translated in the vertical direction, or the like. For example, the extender assembly and the vertical positioner mechanism are operable to sequentially extend and lower the television mounting portion to position at least a portion of the television in front of the fireplace below the wall mounting portion. In some embodiments, the television mounting portion is automatically moved. In other embodiments, the television mounting portion is moved manually. The television mounting portion can be rotated about an axis (e.g., vertical, horizontal, etc.) to an angle equal to or greater than 10 degrees, 20 degrees, 30 degrees, 40 degrees, 50 degrees, 60 degrees 120 degrees, 180 degrees, 240 degrees, or other desired angles. The television can be kept at an orientation (e.g., parallel to a wall orientation) while being translated.

The television mount device can have a three-dimensional range of motion defining a television positioning envelope through which the television can be moved. In some embodiments, the television mounting portion translates in a direction substantially parallel to a user applied force when the television is positioned within the television positioning envelope. This allows the user to conveniently direct and translate the television in any direction within the envelope.

The vertical positioner mechanism can include a user activatable assist device configured to move the television between one or more preset positions, including preset viewing heights (e.g., partially lowered, fully lowered, etc.), preset lateral positions, tilt positions, swivel positions, or the like. The extender assembly can be configured to translate the television mounting portion in a horizontal direction and the vertical position mechanism can be configured to translate the television mounting portion in a vertical direction.

The extender assembly is configured to allow the television mounting portion to be moved in a first direction substantially parallel to a first plane. The vertical position mechanism can be configured to allow the television mounting portion to be moved in a second direction substantially parallel to a second plane that is orthogonal to the first plane. In some embodiments, the television mounting portion can be moved in the horizontal and vertical direction or any other desired direction. The vertical position mechanism can include one or more linear slides that extend to lower the television mounting portion. The linear slides can be telescoping, slidably engage one another, or the like. In some embodiments, the vertical positioner mechanism includes one or more adjustable counterbalance mechanisms configured to counterbalance all or a selected portion of the weight of the television. Other types of force mechanisms can be incorporated into the vertical positioner mechanism.

In some embodiments, a display mount device includes a wall mounting portion, a television mounting portion, and a multidirectional actuation apparatus. The multidirectional actuation apparatus is configured to allow independent linear translation of the television mounting portion in a plurality of directions when the wall mounting portion is mounted to a wall. The wall mounting portion and/or television mounting portion can include one or more multipiece brackets. The brackets can be made of metal, rigid plastic, composites, or combinations thereof. The actuation apparatus can include one or more extender assemblies, vertical positioner mechanisms, translation mechanisms, linear slides, counterbalancing mechanisms, or combinations thereof.

In further embodiments, a television mount device includes a wall mounting portion, television mounting portion, an actuation apparatus configured to provide movement in different directions. The actuation apparatus includes a motorized positioner mechanism that can be programmed with a least one target position. The motorized positioner can include an activation element configured to be operated by a user to cause the motorized positioner mechanism to move the television to at least one target position.

In some embodiments, a display mount device includes a fixed portion, a television mounting portion, and a dynamic component coupled to a fixed portion and the television mounting portion. The dynamic component can have one or more independent degrees of freedom to move the television mounting portion from a first position to a second position. In some embodiments, the dynamic component can have at least three independent degrees of freedom to translate the television mounting portion from a position adjacent the fixed portion to another position different from the first position. The independent degrees of freedom can include motion along a first horizontal axis, a second horizontal axis, and a vertical axis. The second horizontal axis can be different from the first horizontal axis. Additionally, the dynamic component can allow rotation about one or more axes, including a horizontal axis, vertical axis, or axis at another orientation. The dynamic component can include one or more extender assemblies, translation mechanisms, vertical positioner mechanisms, or the like.

In further embodiments, a display mount device includes a fixed mounting portion, a television mounting portion, and a dynamic component including a horizontal movement component, a rotational component, and a vertical movement component. The horizontal movement component can translate the television mounting portion along a horizontal plane. The rotational component can rotate the television mounting portion about at least one axis. The vertical movement component can translate the television mounting portion along a vertical path or axis. The horizontal movement component can include one or more extender assemblies, scissor mechanisms, articulating arms, or the like. The rotational component can include pivot mechanisms, swivel mechanisms, or the like. The vertical movement component can include one or more positioner mechanisms, linear slides, telescoping vertical arms, or combinations thereof.

In some embodiments, a mounting device can be configured to move a television in multiple directions. A substantial portion of the mounting device can be housed within a recessed box or housing located within a wall when in a stowed configuration. In some embodiments, the mount device can collapse into the recessed box or housing such that a majority of the moving components of the mounting device are within the wall. In some embodiments, the television and/or television bracket of the mounting device can be generally flush with an exterior surface of the wall.

In some embodiments, a mounting system includes at least one linear motion mechanism operable to move a television between positions. The linear motion mechanisms can provide rectilinear motion, curvilinear motion, or both. In some embodiments, a linear motion mechanism can provide rectilinear motion in a first direction and another linear motion mechanism can provide rectilinear motion in a second direction. The mounting system can include one or more pivot devices, swivels, rotation mechanisms, etc.

In some embodiments, a television mounting device includes a wall mounting portion, a television mounting portion, and an extender means. The television mounting portion can be configured to carry a display or television. The extender means can be coupled to the wall mounting portion and is configured to move the television mounting portion. In some embodiments, the television mount device further includes a vertical positioning means coupled to the extender assembly. The vertical positioning means is configured to vertically move the television mounting portion independent of operation of the extender means and to move the television mounting portion lower than the wall mounting portion. The extender means can include rotatable arms, scissor mechanisms, and linkage assemblies. The vertical positioning means can include linear rails or slides, a scissor mechanism, a motorized counterbalancing mechanisms, and/or a manual counterbalancing mechanisms.

BRIEF DESCRIPTION OF THE DRAWINGS

In the drawings, identical reference numbers identify similar elements or acts.

FIGS. 24-28 illustrate a vertical positioner mechanism of FIGS. 22-23 configured in accordance with some embodiments of the present technology.

FIGS. 40-42 are side views of recessed television mount devices in raised positions in accordance with embodiments of technology.

DETAILED DESCRIPTION

Figure 1:
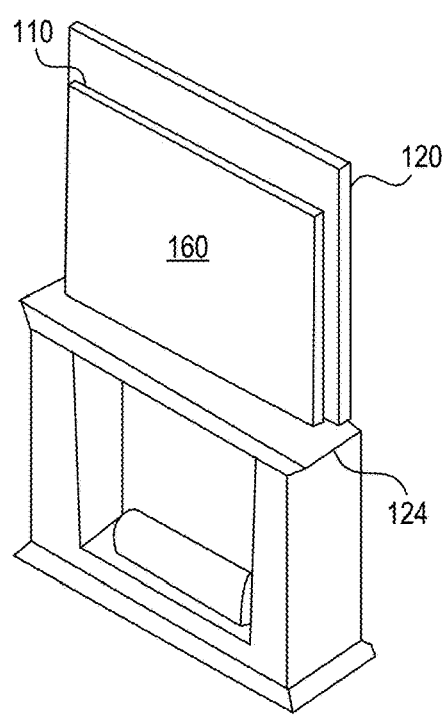
FIG. 1 is a pictorial view of a television installed above a fireplace.
Figure 2:
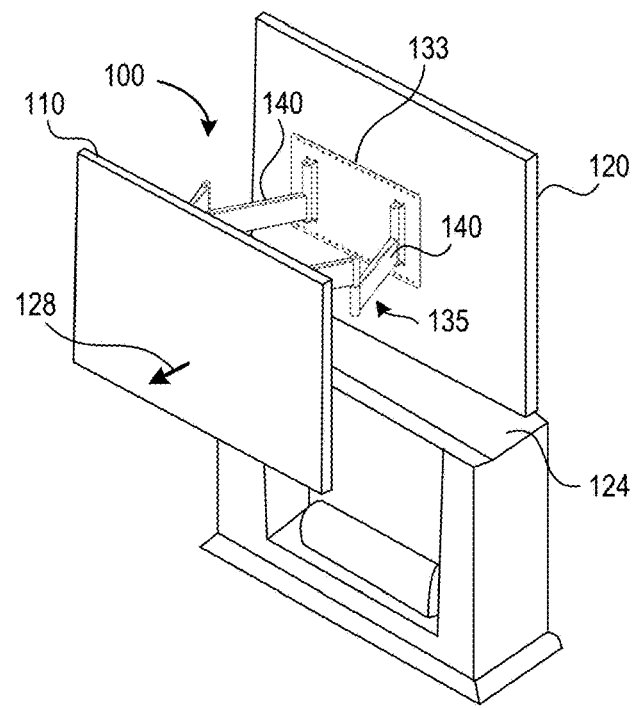
FIG. 2 shows the television in a raised forward position.
Figure 3:
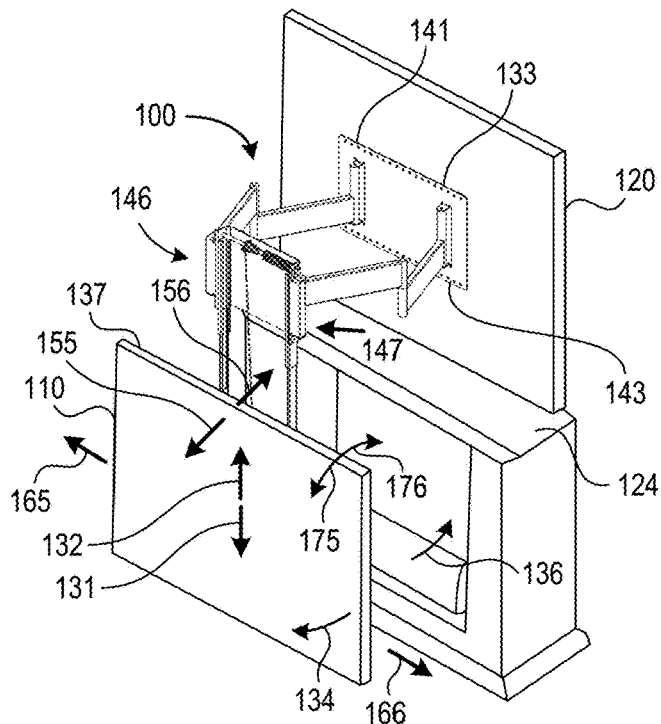
FIG. 3 shows the television in a lowered forward position in front of the fireplace.

FIG. 1 shows a display or television 110 ("television 110") in a raised rearward or stowed position and very close to a wall 120. FIG. 2 shows the television 110 in a raised forward position. FIG. 3 shows the television 110 in a lowered forward position in front of the fireplace. A multidirectional display mount 100 ("display mount 100," sometimes also referred to herein as a "mount device" or a "television mount device"), which is visible in FIGS. 2 and 3, can be hidden from view of someone in front of the stowed television 110 for an aesthetically pleasing appearance. The display mount 100 allows the television 110 to be moved in different directions to avoid contacting obstacles. For example, the television 110 can be moved independently in the horizontal and vertical directions. In some manually operated embodiments, a user can conveniently grasp and pull the television 110 away from the wall 120. The bottom of the television 110 can be kept at substantially the same height to avoid striking the top of a mantelshelf 124 (sometimes referred to herein as a "mantel 124"). After the bottom of the television 110 has moved forwardly past the mantelshelf 124, the television 110 can be pulled downwardly past the top surface of the mantelshelf 124. In this manner, the television 110 can be brought down and in front of the mantelshelf 124 or any other protruding object below the display mount 100.

FIG. 1 shows the stowed television 110 positioned above a fireplace to avoid occupying usable space and to reduce the likelihood of unwanted inadvertent contact by people moving about the room. If the fireplace includes a hearth, it may be difficult for small children, or other individuals, to inadvertently contact the stowed television 110. In some embodiments, the television 110 can be generally flat against or parallel to the wall 120 (e.g., parallel to the wall 120) to minimize or limit unwanted reflections from a screen 160 that may be directed to someone sitting on furniture in front of the television 110, especially when the television 110 is turned off. The bottom of the television 110 can be held directly above the mantelshelf 124.

FIG. 2 shows the raised television 110 after a user has pulled, as indicated by arrow 128, the television 110 away from the wall 120. For example, a user can grip and pull the television 110 horizontally away from the wall 120 while the mount device 100 holds the television 110 in an upright orientation. The mount device 100 can include a mounting portion 133 and a multidirectional actuation apparatus with an extender assembly 135 rotatably coupled to the mounting portion 133. The extender assembly 135 can include one or more articulating arms 140 that allow horizontal movement of the television 110. In some embodiments, including the illustrated embodiment, the extender assembly 135 includes a pair of articulating arms 140. A user can apply forces to the television 110 to independently articulate the arms 144 for lateral movement, swiveling, and/or complex movements of the television 110. The television 110 can be moved vertically downward to a desired lowered position while the arms 140 remain in the horizontal orientation.

FIG. 3 shows the television 110 after it has been moved to a lowered forward position. The display mount 100 includes a dynamic component in the form of a multidirectional actuation apparatus 146 ("actuation apparatus 146") configured to provide, for example, forward/rearward movement (indicated by arrows 155, 156), side-to-side swiveling (indicated by arrows 134, 136), vertical movement (indicated by arrows 131, 132), and/or side-to-side movement (indicated by arrows 165, 166). In some embodiments, the display mount 100 includes a tilt mechanism configured for tilting (indicated by arrows 175, 176) or other components for additional movement.

The actuation apparatus 146 can include the extender assembly 135 and a vertical positioner mechanism 147. The vertical positioner mechanism 147 can counterbalance the weight of the television 110 to hold the television 110 and also allow raising/lowering of the television 110 with a minimal amount of applied force. The television 110 can remain spaced apart from the mantel 124. A top 137 of the television 110 (e.g., when in a lowermost position) can be lower than most or all of the mounting portion 133. The screen of the television 110 can be substantially perpendicular to a sitting viewer's line of sight, substantially parallel to a front surface of the wall 120, or at another desired orientation. For example, the top 137 of the lowered television 110 can be lower than a top 141 and/or a bottom 143 of the mounting portion 133. One or more adjustable or fixed stops can be used to prevent contact with the mantel 124 or to achieve repeatable positioning, or both. The stops can be incorporated into components of the display mount 100, and the configuration of the actuation apparatus 146 can be selected based on a target motion, range of motion, and/or number of degrees of freedom.

The lowered television 110 is especially well suited for viewing when someone is positioned near the television 110, for example, to play a game system (e.g., Xbox 360, PlayStation®, PlayStation® 2, PlayStation® 3, Nintendo game system, or the like), or to provide convenient viewing while sitting, for example, on furniture or on the floor. The display mount 100 allows the television 110 to be moved horizontally away from the fireplace to prevent excess heating of the television 110 when the fireplace place is used. The television 110 can be returned to the stowed position of FIG. 1.

The mount device 100 allows the television 110 to be deployed along different paths of travel and can include one or more pivots, swivels (e.g., swivel brackets, auto-straightening devices, etc.), joints, stops, locks, brakes, friction elements, or the like. For two-step positioning, the television 110 can be moved horizontally from the stowed position (FIG. 1) to a raised forward position (FIG. 2). The television 110 can then be lowered to a lowered forward position (FIG. 3). The two-step positioning can be used to keep the television 110 spaced apart from the mantelshelf 124. In some embodiments, the mount device 100 has a mechanical or electrical release (e.g., a user-assist device or mechanism) that allows the television 110 to be lowered after the television 110 has moved, for example, to a preset position, a distance from the wall, or a distance from another reference point. This prevents contact between the television and the mantelshelf 124. In other embodiments, the user can determine when to pull down on the television 110 to overcome the counterbalancing force, thereby lowering the television to the desired height. For one-step positioning, the television 110 can be moved along a curved path or linear path from the stowed position (FIG. 1) to the lowered forward position (FIG. 3).

The mount device 100 can be coupled to a wide range of different types of support structures, such as walls of a dwelling (e.g., a house, an apartment, etc.), an office, a lobby, a bar (e.g., sports bar), a restaurant, or the like and can be mounted to vertical walls or non-vertical walls, including, without limitation, angled walls, non-planar walls, or other structures sturdy enough to handle the load of the mount device 100 and any attached object(s). The mounting portion 133 can be configured to be mounted to a surface of the wall 120. For example, as discussed in more detail below, a substantial portion of the mount device 100 can be housed within a recessed box or housing located within a wall when in a stowed configuration. In some embodiments, the mount device 100 can collapse into the recessed box or housing such that a majority of, or all of, the moving components of the mount device 100 are within the wall. In some embodiments, the television and/or television bracket can be generally flush with an exterior surface of the wall. In some embodiments, the mounting portion 133 can be configured to be positioned at least partially within the wall, as discussed in connection with FIGS. 40-42.

In some motorized embodiments, the mount device 100 can include motorized swivel mechanisms, swivel/tilting mechanisms, drive motors, or the like to provide motorized positioning and can include one or more controllers. The positioning capabilities of the mount device 100 can be selected based on target viewing positions. In some manually operated embodiments, a user can conveniently grasp and pull the television 110 away from the wall 120. The bottom of the television 110 can automatically swing away from the wall 120 to keep the television 110 from striking the top of a mantel 124. After the bottom of the television 110 has moved forwardly past the mantel 124, the television 110 can be lowered downwardly past the top surface of the mantel 124. In this manner, the television 110 can be manually brought down and in front of the mantel 124 or any other protruding object below the mounting portion 133. In some embodiments, the mount device 100 can have both a manual mode for manually moving the television and a motorized mode for robotically moving the television.

The mount device 100 can include one or more features that prevent contact with the mantel 124 or provide repeatable positioning, or both. The features can include fixed stops, friction elements, motion inhibitors, or other elements that can be incorporated into the mount device 100. The mount device 100 can also include one or more biasing mechanisms, counterbalancing mechanisms, drive trains, pulley systems, gear systems, motors, indexers, sprockets, belts, chains, or combinations thereof. In some embodiments, the mount device 100 can have four, five, or six degrees of freedom, thereby allowing a user to precisely position a TV. The number and configuration of components of the mount device 100 can be selected based on the degrees of freedom and range of motion.

The television 110 can be, without limitation, a liquid crystal display (LCD) television, a plasma television, a light emitting diode (LED) television, or other type of flat-screen television, as well as other types of wall-mountable televisions. The weights of such televisions are often in a range of about 20 pounds to about 110 pounds and often have a maximum thickness less than about 5 inches. In some embodiments, the television weighs at least about 20 pounds, 40 pounds, 60 pounds etc. The mount device 100 holds the television 110 in an upright orientation while the television 110 is pulled downwardly. Advantageously, large screen televisions have a screen with a length (measured diagonally) equal to or greater than about 30 inches, 50 inches, 60 inches, 70 inches, 80 inches, 85 inches, etc., and can hide the entire mount device 100, as shown in FIG. 1. The mount device 100 can also hold small or medium screen televisions. Other types of electronic displays (e.g., monitors) or objects can be carried by the mount device 100. Exemplary mountable objects include, but are not limited to, screens suitable for use with front projectors, boards (e.g., a chalk board, a dry erase board, etc.), containers (e.g., a basket, a bin, etc.), or the like.

Figure 4:
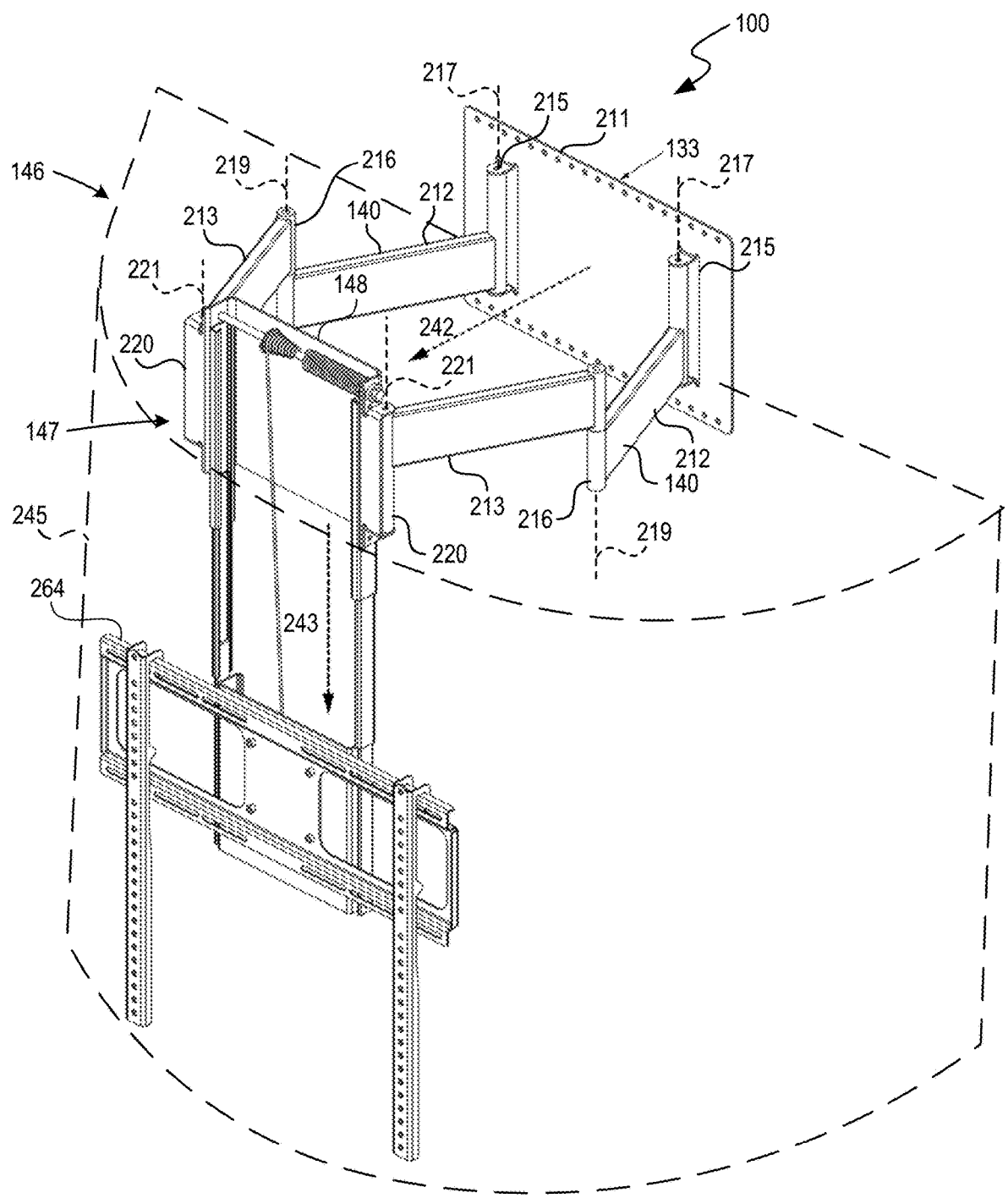
FIG. 4 is an isometric view of a multidirectional display mount in accordance with an embodiment of the technology.

FIG. 4 is an isometric view of the display mount 100 of FIGS. 1-3. The wall mounting portion 133 can include a plate or member 211 and pivots 215. Each articulating arm assembly 140 is coupled to a respective pivot 215 on a bracket 148 that is coupled to the vertical positioner mechanism 147. Each articulating arm assembly 140 can be independently articulated to allow swiveling, panning, rotation, and/or displacement of the bracket 148, thereby also articulating the vertical positioner mechanism 147. By independently operating the arm assemblies 140, desired movement of the television 110 can be achieved. For example, the television can be moved to a nonparallel or parallel relationship to the mounting portion 133 and/or wall 120 (FIGS. 1-3).

Each articulating arm assembly 140 can include arms 212, 213 pivotally coupled to the wall mounting portion 133 and positioner mechanism 147, respectively. For example, each arm 212 is rotatable about axes of rotation 217 defined by the pivot 215. Each arm 213 is rotatable about an axis of rotation 219 defined by a pivot 216 and rotatable about an axis of rotation 221 defined by a pivot 220. In the illustrated embodiment, the axes of rotation 217, 219, 221 are generally parallel and at substantially vertical orientations. This allows the positioner mechanism 147 to be moved horizontally, as indicted by arrow 242. The extender assembly 135 can hold the upper portion of the positioner mechanism 147 vertically stationary while the television 110 is lowered, as indicated by arrow 243. The number, orientations, and positions of the axes can be selected based on the desired range of motion.

The mount device 100 can be configured to move the television within a television positioning envelope 245 (illustrated in dashed line). For example, the actuation apparatus 146 can provide a three-dimensional range of motion within the television positioning envelope 245. A user can manually grasp and pull the television anywhere within the television positioning envelope 245. In some embodiments, including the illustrated embodiment, the television positioning envelope 245 has a partially cylindrical volume that is located generally below the mount 100. As such, the television can be moved along an arcuate path extending laterally to the sides of the mounting portion 133. The range of travel in the forward/rearward direction can be about 40%, 50%, 60%, 70%, 80%, or 90% of the maximum lateral travel (e.g., total distance of travel in opposite directions away from sides of the wall mounting portion 133). The television positioning envelope 245 can have a substantially semi-circular shape, semi-elliptical shape, or another cross-sectional shape taken along a plane that is perpendicular to a vertical axis. The configuration, dimensions, and connections between components of the display mount 100 can be selected based on the desired size and configuration of the television positioning envelope 245. The display mount 100 can include, without limitation, one or more stops, positioning features (e.g., pins, locks, etc.), extenders, contractors, or other features for adjusting configuration of the television positioning envelope 245 and/or display mount 100. This allows for flexibility after installation. For example, if an object is placed underneath the display mount 100, components can be installed to limit motion to avoid contact between the TV and the object.

Figure 5:
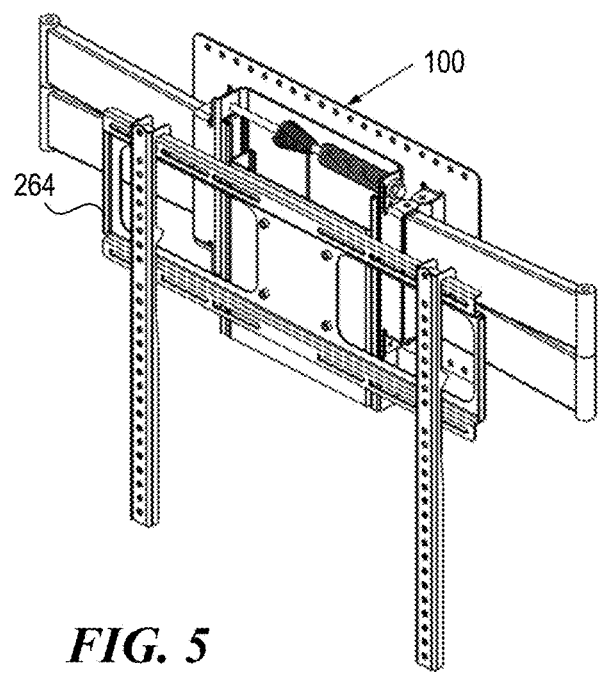
FIG. 5 is an isometric view of the display mount.
Figure 6:
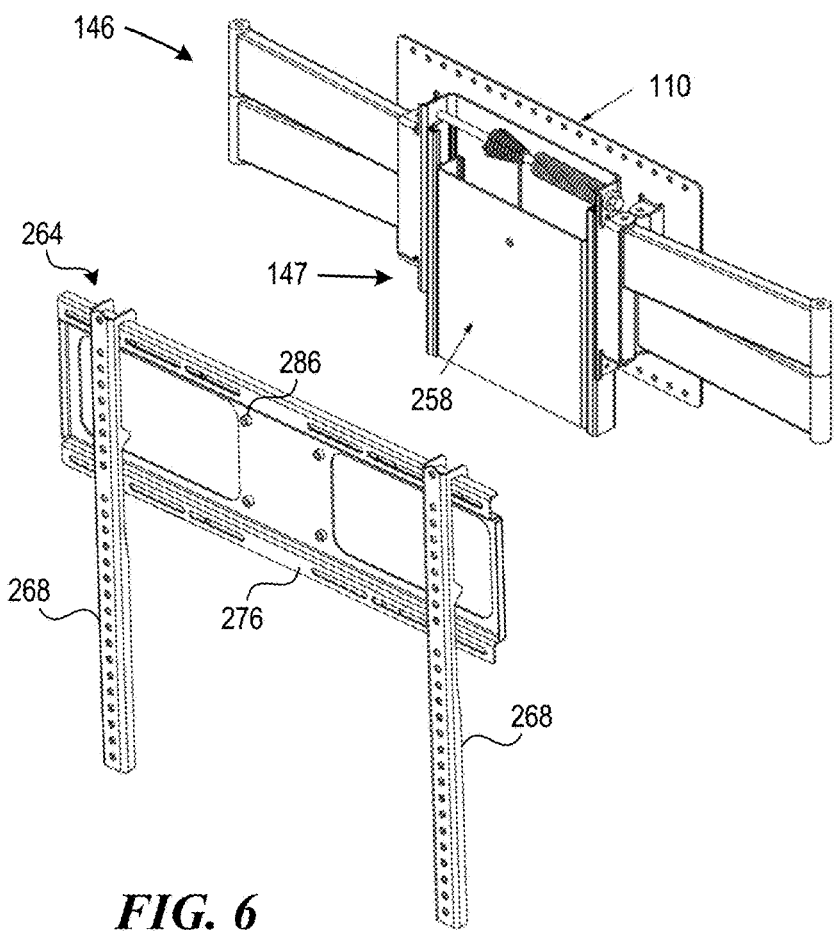
FIG. 6 is an exploded isometric view of the display mount.

FIG. 5 is an isometric view of the display mount 100 in a collapsed configuration. FIG. 6 is an exploded isometric view of the display mount 100. Referring to FIG. 6, the actuation apparatus 146 is in a collapsed configuration. The positioner mechanism 147 can include a television mounting portion 258 that includes or is coupled to a television bracket 264. The television bracket 264 can include one or more rails 268 (e.g., hanging rails, sliding rails, etc.), frame or plates 276, fasteners, or combinations thereof. In some embodiments, the television bracket 264 is fixedly coupled to a mounting member or portion 258 by fasteners 286 (one identified in FIG. 6). In some embodiments, the mounting portion 258 can have an integrated mounting bracket having a plurality of hanging rails 268 slidable to adjust and accommodate different size TVs. In some multi-piece embodiments, the television bracket 264 includes extruded or stamp metal rails 268 configured to hang on features of the plate 276. In some one-piece embodiments, the television bracket 264 can be made of metal or other rigid material formed via a molding process, stamping process, or combinations thereof. For example, the television bracket 264 can be a unitary construction and made of metal or composite material. The number, configuration, and components of television bracket 264 can be selected based on the configuration of the television.

Figure 7:
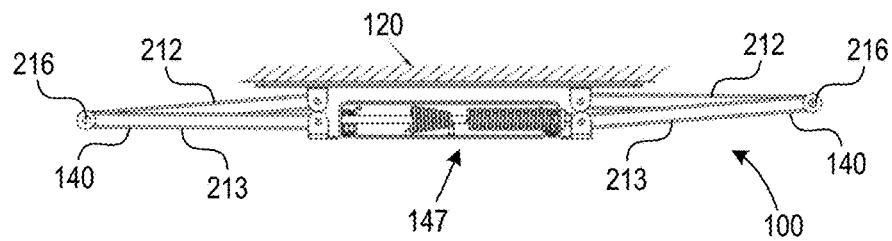
FIG. 7 is a top view of components of the display mount that is coupled to a wall.
Figure 8:
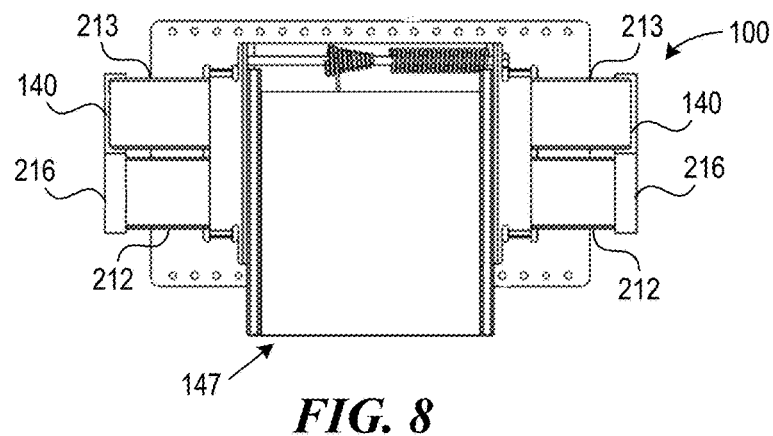
FIG. 8 is a front view of the display mount of FIG. 7.

FIGS. 7 and 8 are top and front views of the display mount 100 in accordance with an embodiment the technology. Television mounting components (e.g., television bracket 264 of FIG. 6) are not shown. The vertical adjustment mechanism 147 can be generally positioned between the folded articulating arms 140 for thin profile, as shown in FIG. 7. The arms 212, 213 are generally parallel to one another and in a generally vertical arrangement. In some embodiments, the arm 213 is located above the arm 212. In other embodiments, the arm 212 is located above the arm 213. Each pivot 216 can include a pin extending through openings in the arms 212, 213. The configuration and position of the arms 212, 213 and pivots 216 can be selected based on the desired collapse configuration and expand configuration.

Figure 9:
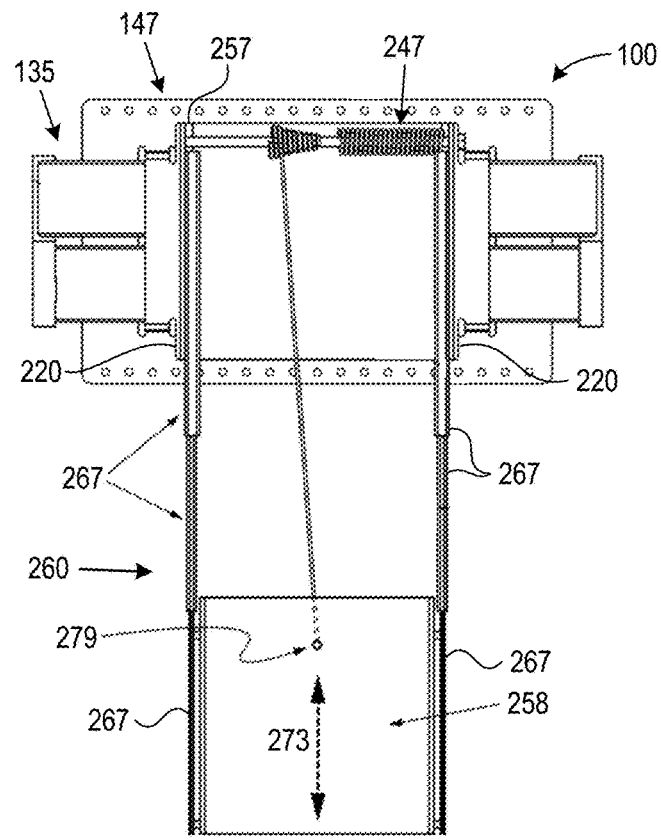
FIG. 9 is a front view of the display mount of FIG. 7 configured to hold a television in a lowered position.
Figure 10:
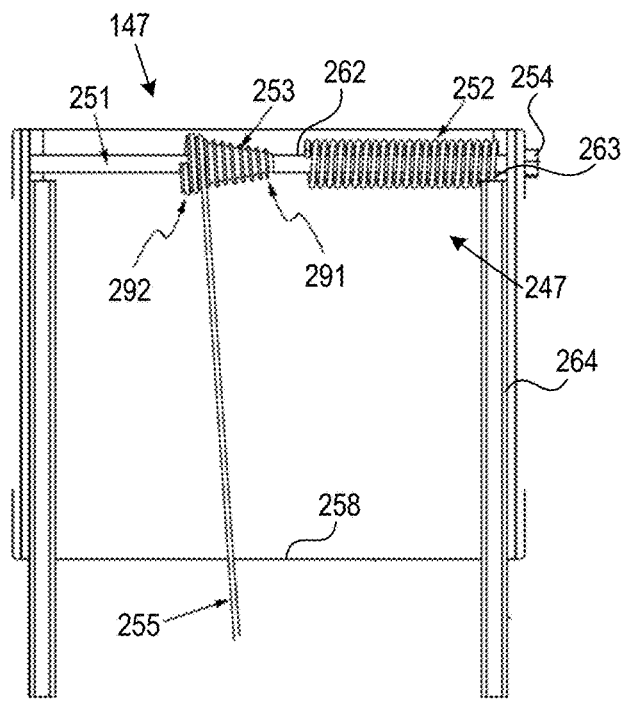
FIG. 10 is a detailed view of a portion of a vertical positioning mechanism.

FIG. 9 is a front view of the display mount 100 with the positioner mechanism 147 in a lowered position. FIG. 10 is a detailed view of a portion of the positioner mechanism 147. Referring to FIG. 9, the positioner mechanism 147 can include a telescoping assembly 260 coupled to the extender assembly 135 and/or TV frame 257. The telescoping assembly 260 can include extenders 267 that cooperate to allow the TV mounting portion 258 to be translated vertically, as indicated by arrows 273. The extenders 267 include, without limitation, one or more linear slides, telescoping assemblies, carriage/rail assemblies, or the like. In some embodiments, the extenders 267 include a plurality of linear slides that extend from one another to lower the TV mounting portion 258. The number, configuration, and orientation of the extenders 267 can be selected based on the desired range of motion.

The positioner mechanism 147 can include a connector 255 fixedly coupled to an attachment 279 of the TV mounting portion 258. The connector 255 can include, without limitation, one or more tethers, cables, belts, chains, or flexible components. The positioner mechanism 147 further includes a counterbalancing mechanism 247 that allows a user to effortlessly move the television to different vertical positions but prevents or inhibits movement of the television when the user does not apply a force. The television can be moved using a force that is less than a threshold force. The threshold force can be about 1 $lb_f$, 2 $lb_f$, 3 $lb_f$, 5 $lb_f$, 10 $lb_f$, 20 $lb_f$, 30 $lb_f$, or 40 $lb_f$, as well as any other suitable threshold force. An adjuster 254 can be rotated to gradually increase or decrease the counterbalancing force, thereby adjusting the threshold force by at least 1 $lb_f$, 2 $lb_f$, 3 $lb_f$, 5 $lb_f$, 10 $lb_f$, or 20 $lb_f$. The counterbalancing mechanism 247 can be adjusted to provide a desired constant or variable counterbalancing force. The mount 100 can provide a generally constant counterbalancing force for most or substantially all of the vertical travel of the television. The percent variation of the counterbalancing force during operation can be at or below a threshold level. For example, the variation of the counterbalancing force can be equal to or less than 1%, 2%, 5%, or 10% for a predefined amount of television travel (e.g., at least 70%, 80%, 90%, 95%, or 100% of travel). In some embodiments, the percent change, if any, of the counterbalancing force can be equal to or less than 1%, 2%, 5%, 10%, or 20% for a predefined amount of television travel (e.g., at least 50%, 60%, 70%, 80%, 95%, or 100% of travel, such as 0.2 m, 0.3 m, 0.4 m, 0.5 m, 0.7 m, 0.8 m, 1 m, 2 m, 3 m, etc.). In other embodiments, the pulley system 550 can provide a varying counterbalancing force to, for example, slow movement of the television near the end of travel. The increase or decrease of counterbalancing forces can be set based on the weight of the television, range of motion, and desired feel.

Referring to FIG. 10, the counterbalancing mechanism 247 includes a torsion shaft 251, a torsion spring 252, torsion adjuster 254, and a pulley 253. The torsion spring 252 can provide torsion based on the weight of the TV by rotating an adjuster 274. For example, the torsion can be generally equal to the weight of the television. The torsion spring 252 can include first end 262 fixedly coupled to the shaft 251 and a second end 263 coupled to the extenders 264 (e.g., a frame or rail extension mechanism). The torsion adjuster 254 can be rotated in one direction to increase the tension of (wind)

the torsion spring 252 and in the opposite direction to unwind the torsion spring 252.

In operation, the tension of the spring 252 is increased or decreased by the adjuster 254 such that the connector 255 (e.g., a cable or other suitable component) pulls equally against the weight of the television, thereby functioning as a counterbalance. In some embodiments, the counterbalancing mechanism 247 can be configured to provide a substantially constant counterbalancing force. The torsion spring 252 can be wound tighter, and during vertical movement it's rotational torque increases. To counteract this increase during operation, the pulley 253 can be tapered. For example, the pulley 253 can increase in diameter from the fully wound region 291 to the fully unwound region 292. As such, the pulley 253 is configured to at least partially counteract changes to the biasing force provided by the spring 252. As the connector 255 unwinds, the distance between the tangential portion of the connector 255 and a centerline of the shaft 251 increases and provides an equal and opposite increase in torque. This results in the weight of the TV being counterbalanced with a generally constant and equal pull provided via the connector 255, thus allowing almost effortless raising and lowering of the television. In some embodiments, the counterbalancing mechanism 247 can include one or more biasing elements (e.g., torsion springs, compression springs, etc.), pistons (e.g., gas pistons, pneumatic pistons, etc.), or other type of biasing devices capable of providing a desired force, including, without limitation, a substantially constant force, variable force, or the like. The configuration of the counterbalancing mechanism 247 can be selected based on the range of travel and target counterbalancing force.

Figure 11:
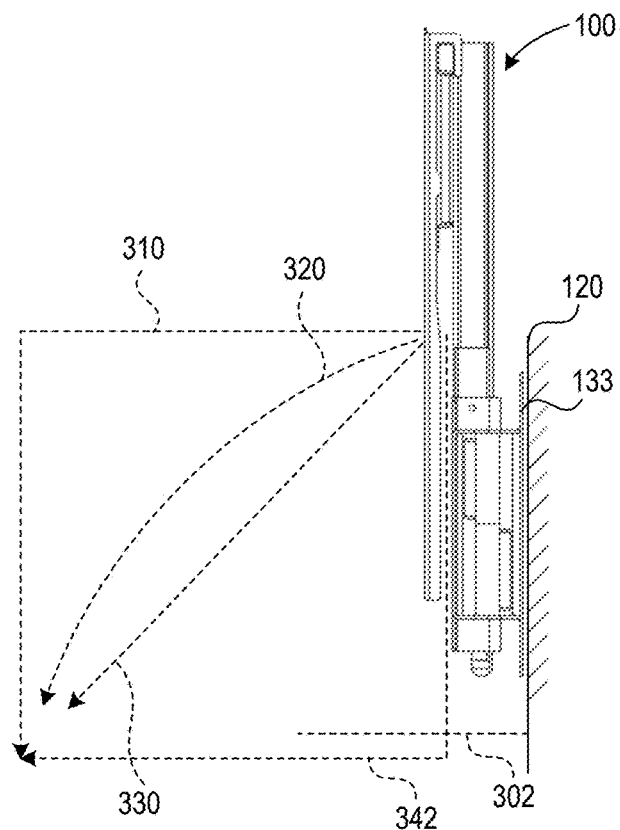
FIGS. 11-13 are side views of a multidirectional display mount in different configurations in accordance with an embodiment of the technology.
Figure 12:
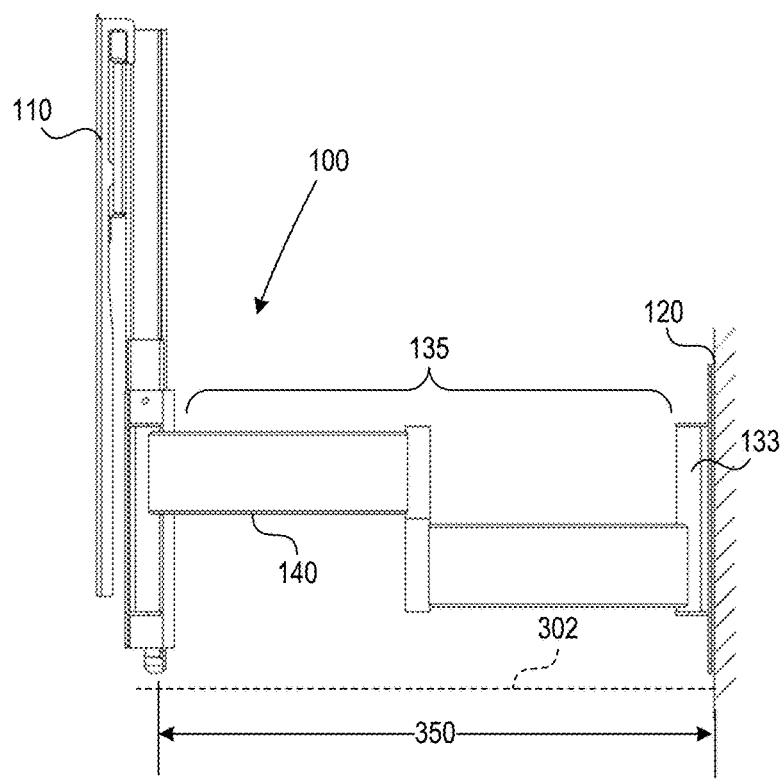
Figure 13:
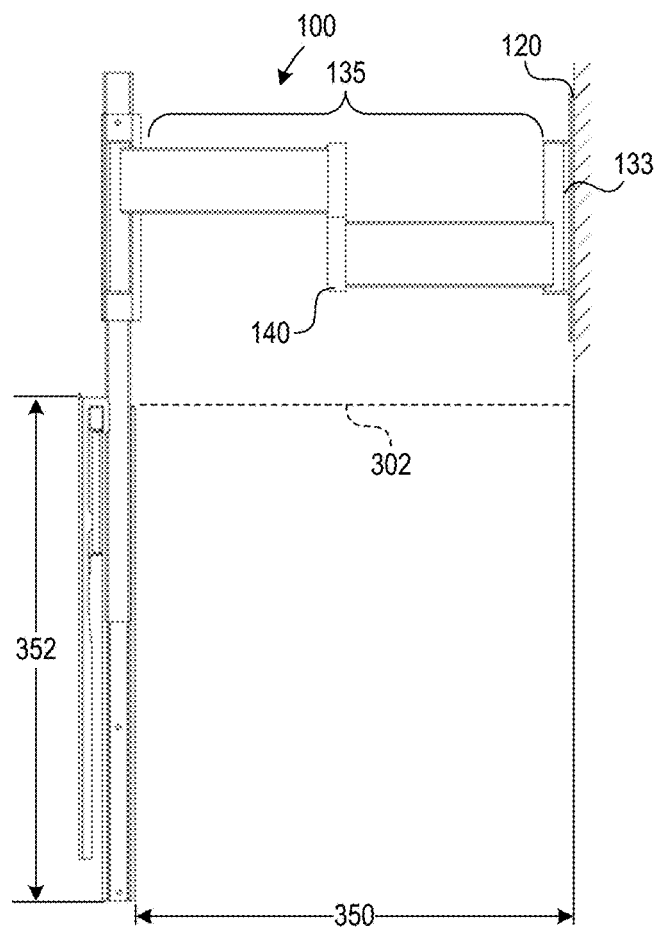

FIGS. 11-13 are side views of the display mount 100 in different configurations. FIG. 11 shows the display mount 100 in a stowed configuration. FIG. 12 shows the display mount 100 configured to hold a television at a forward raised position. FIG. 13 shows the display mount 100 configured to hold the television at the forward lowered position. Referring now to FIG. 11, to avoid contact with an object directly underneath the mount 100, the television can be manually moved along a desired path, such as one of paths 310, 320, 330, 342. The mount 100 can include one or more release mechanisms, latches, other components to limit movement, paths, etc. The display mount 100 can hold the television above a reference plane or height 302, illustrated as a horizontal plane directly below the mounting portion 133. The television and components of the display mount 100 can be kept spaced apart from the reference plane 302.

Although FIG. 11 shows examples paths 310, 320, 330, 342, the television can be moved along other paths. The example horizontal/vertical path 310 shows two-stage motion in which the television is moved in a substantially horizontal direction from a retracted position to a forward position. The terms "substantially horizontal" generally refers to directions within about +/−2 degrees of horizontal, for example, within about +/−1 degree of horizontal such as within about +/−0.8 degrees of horizontal. Substantially horizontal also refers to ranges of small angles from horizontal, for example, angles between about 0.1 degrees and 1.8 degrees from horizontal, such as angles between about 0.2 degrees and about 1.2 degrees, or, for example angles between about 0.3 degrees and about 0.8 degrees. The term "substantially vertical" generally refers to directions within about +/−2 degrees of vertical, for example, within about +/−1 degree of vertical, such as within about +/−0.8 degrees of vertical. For example, the television can be moved sequentially substantially horizontally (e.g., 1 ft, 2 ft, 3 ft, etc.) and then substantially vertically (e.g., 1 ft, 2 ft, 3 ft, etc.). The total distance of travel can be, for example, 2 ft, 3 ft, 4 ft, 5 ft, 6 ft, 7 ft, 8 ft, etc. The distance of the segments of travel and total travel can be selected based on desired television positioning. The television can be moved along other paths, such as path 320 or linear path 330. In some embodiments, the display mount 100 can move the television in a first direction in a first plane and a second direction substantially parallel to a second plane that is orthogonal to the first plane. In some embodiments, the television can be moved downwardly and then forwardly along the path 342. The direction of movement of the television can be aligned with (e.g., parallel to) the user applied force. The television can be moved to other positions within the range of motion.

FIG. 12 shows the extender assembly 135 in a fully deployed or extended configuration. The articulating arms 140 can be generally straight to limit additional forward travel. When the vertical positioner mechanism 147 lowers the television, the articulating arms 140 can be automatically locked to inhibit or forward/rearward motion. This can prevent contact with an object underneath the display mount 100 when the television is partially or fully lowered. In other embodiments, the articulating arms 140 are freely rotatable, including when the television is raised or lowered.

After the positioner mechanism 147 has been moved a distance 350 (e.g., 1 ft, 2 ft, 3 ft, etc.) from the wall 120, the television can be lowered. For example, the television can be moved along a vertical line of action. The display mount 100 can include an optional latch mechanism that requires the television be moved to the forward position (e.g., a position set by the user) before the positioner mechanism 147 is unlocked. This prevents the television from being pulled downward when the television is directly above an object next to the wall. As the television is lowered a distance 352 (FIG. 13), the horizontal position of the television can be maintained (e.g., distance 350 can be maintained) to keep the television or display mount 100 from contacting any objects underneath the mounting portion 133. The distance 352 can be 6 in, 1 ft, 2 ft, 3 ft, or other suitable length. In some embodiments, the positioner mechanism 147 can allow both vertical movement above and vertical movement below the mounting portion 133.

Figure 14:
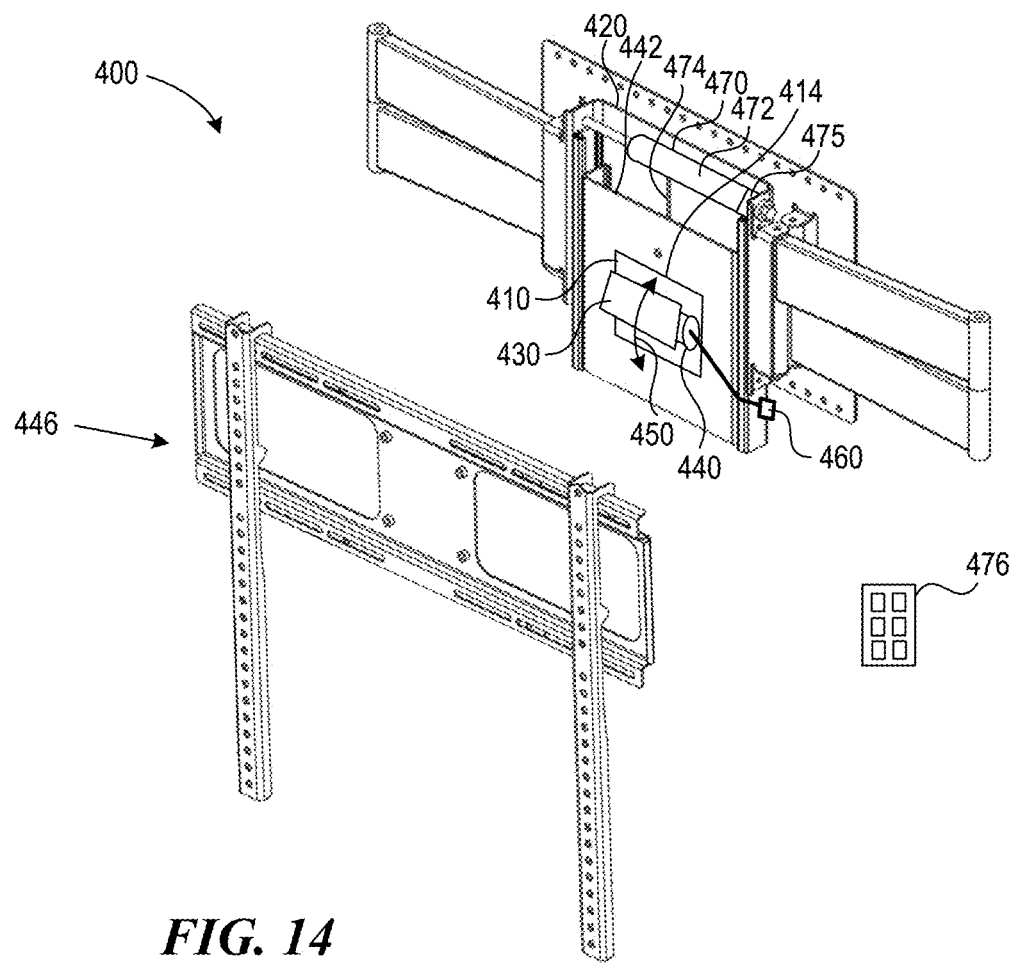
FIG. 14 is an exploded isometric view of a multidirectional display mount with a tilting device in accordance with an embodiment of the technology.

FIG. 14 is an exploded isometric view of a multidirectional display mount 400 in accordance with an embodiment of the technology. The description of the display mount 100 of FIGS. 1-13 applies equally to the display mount 400 unless indicated otherwise. The display mount 400 can include a tilting mechanism 410 coupled to a vertical positioner mechanism 420. The tilting mechanism 410 can include a mounting plate 414, a pivot plate 430, and a hinge 440. The mounting plate 414 can be fixedly coupled to a translating mounting portion 442. The pivot plate 430 can be coupled to a television mounting bracket 446. In the illustrated embodiment, the tilting mechanism 410 is oriented such that the television bracket 446 can be rotated about a generally horizontal axis of rotation, as indicated by arrows 450. The tilting mechanism 410 can include an optional actuator 460 operable to unlock and lock the tilting mechanism 410.

The vertical positioner mechanism 470 can include one or more motors 472, connectors 474, controllers 475, communication elements (e.g., transmitters, receivers, etc.), etc. The positioner mechanism 470 can be in communication with a controller or remote control 476 ("remote control 476"). The controller 475 can include a receiver that is communicatively coupled (e.g., wirelessly coupled, capacitively coupled, inductively coupled, or the like) to a transmitter of the remote control 476. The controller 475 can include, without limitation, one or more electronic modules, power supplies, software, or combinations thereof. Exemplary controllers and controller components are discussed in connection with FIG. 44.

The controller 475 and/or remote control 476 can include one or more input elements (e.g., keys, touch screen, buttons, etc.), microphones, and memory. Buttons can include preset position buttons, up/down buttons, tilt buttons, swivel buttons, or the like. The memory can include, without limitation, volatile memory, non-volatile memory, read-only memory (ROM), random access memory (RAM), and the like. Stored information can include, but is not limited to, executable instructions for performing methods disclosed herein, settings, the weight of the mounted object, or the like. Settings can include, but are not limited to, position settings (e.g., stowed positions, lowered positions, intermediate positions, or the like), schedules (e.g., schedules to automatically move the object), or the like.

Figure 15:
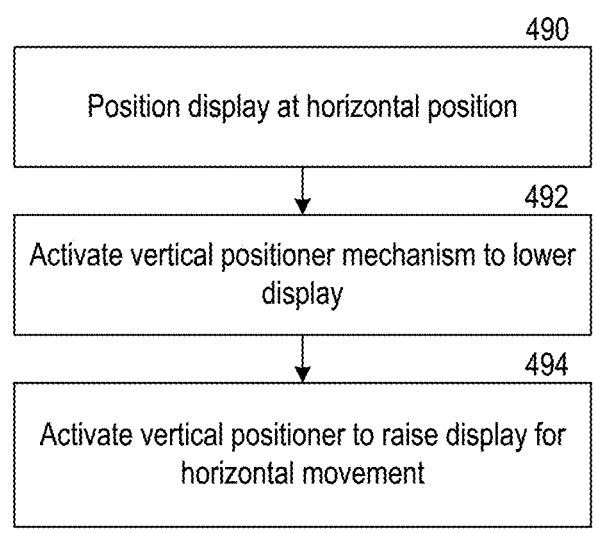
FIG. 15 shows a method of operating an electronic multidirectional display mount in accordance with an embodiment of the technology.

FIG. 15 shows a method of operating a motorized multidirectional display mount in accordance with an embodiment of the technology. At block 490, a display (e.g., a flat screen television) can be moved to a target position. At block 492, a controller (e.g., remote control 476 of FIG. 14) can be used to activate a vertical positioner mechanism to lower the display. In some embodiments, the vertical positioner mechanism can be automatically activated when the display reaches a set position. For example, the display can be pulled away from the wall until it reaches a deployed position. The vertical positioner mechanism (e.g., vertical positioner mechanism 420 of FIG. 14) can then be activated to lower the display. The television can be returned to the stowed position. At block 494, the vertical positioner mechanism can be activated to raise the display for subsequent manual movement back to a stowed position.

Figure 16:
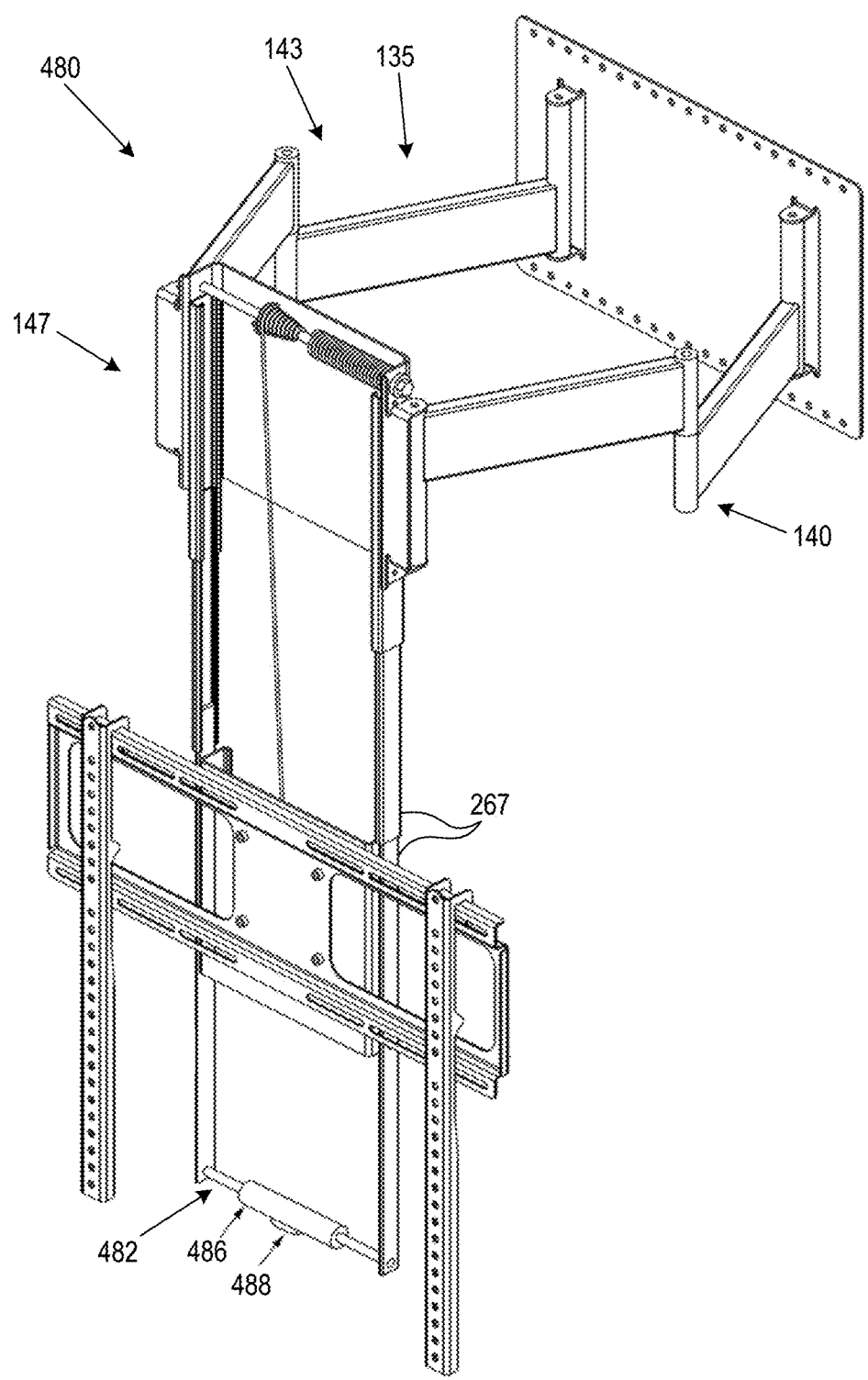
FIG. 16 is an isometric view of a multidirectional display mount with a user assist device in accordance with an embodiment of the technology.

FIG. 16 is an isometric view of a multi-directional display mount 480 in accordance with an embodiment of the technology. The description of the display mounts discussed in connection with FIGS. 1-15 applies equally to display mount 480 except as indicated otherwise below. The display mount 480 can include a user-assist device in the form of a locking mechanism 482 operable to selectively operate the vertical positioner mechanism 147. The locking mechanism 482 can be a user-assist device having a handle 486 and an actuation or activation element 488 ("activation element 488"). The activation element 488 can be operable by a user to control the state of the mount 480. To lower the television, the activation element 488 can be depressed to unlock the vertical positioner mechanism 147. The user can then apply a downward force to the handle 486 to lower the television (not shown). Once the television is at the desired position, the activation element 488 can be released to lock the vertical positioner mechanism 147. To raise a television, a user can depress the activation element 488 to unlock the vertical positioner mechanism 147. The user can then apply an upward force to the handle 486 to raise the television. Once the television reaches the desired height, the activation element 488 can be released to lock the vertical positioner mechanism 147. In this manner, the locking mechanism 482 is used to selectively lock/unlock the vertical positioner mechanism 147.

The locking mechanism 482 can include one or more latches, pins, or other features used to lock and unlock the vertical positioner mechanism 147. For example, the activation element 488 can control movement of latch that locks together the extenders 267. In some electronic embodiments, the locking mechanism 482 can include one or more electronic locking mechanisms, motors, controllers, or the like and can be positioned behind the television. In some embodiments, the handle 486 can be rotated in one direction for locking and in the other direction for unlocking. In yet other embodiments, the handle 46 can be pushed rearwardly or forwardly for unlocking or locking, respectively. This allows a user to conveniently raise and lower the television. The configuration, components, and functionality of locking mechanism 482 can be selected based on a desired locking capability. The locking mechanism 482 can be positioned to other locations. For example, the activation element 488 can be located along the articulating arms 140, articulation apparatus 135, or at other accessible locations accessible.

Figure 17:
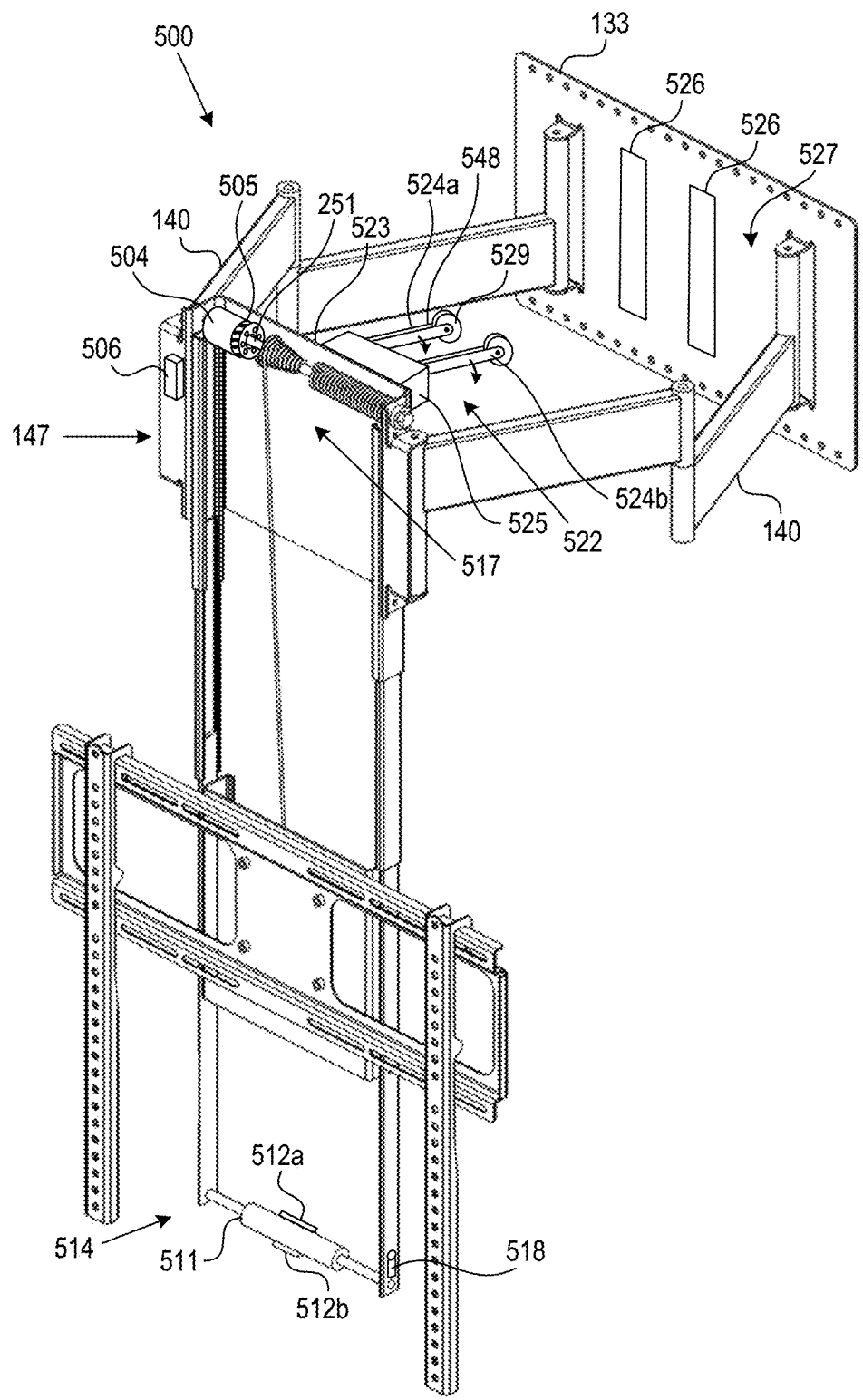
FIG. 17 is an isometric view of a multidirectional display mount with a user-assist device in accordance with an embodiment of the technology.

FIG. 17 is an isometric view of a multi-directional display mount 500 in accordance with another embodiment of the technology. The display mount 500 can include a motorized counterbalancing system with one or more motors 504 operable to drive the television upwardly and downwardly. The motor 504 can be connected to the torsion shaft 251 via one or more gears 505. In some embodiments, an output shaft of the motor 504 is mechanically coupled to an end of the torsion shaft 251. The mount 500 can also include a controller 506 in communication with the motor 504.

The display mount 500 can include user-assist device or positioning mechanism 514 ("positioning mechanism 514") in communication with a motorized counterbalancing mechanism 517 via one or more connections, such as wired connections, wireless connections, optical connections, or the like. The handle 511 can include an upper activation element 512a and a lower activation element 512b. A user can press the activation elements 512a, 512b to cause the television to be lowered and raised, respectively. In some embodiments, a positioning mechanism 514 is user-activatable with a single activation element 512 that can be depressed to move the television. In the illustrated lowered position, the activation element 512 can be depressed to cause the vertical positioner mechanism 147 to operate to pull the television upwardly to the raised position. When the television is in the raised position, the activation element 512 can be depressed to command the counterbalancing mechanism 517 to lower the television. The number, positions, and configuration of the control or activation elements can be selected based on the accessibility of the positioning mechanism 514. In some embodiments, the positioning mechanism 514 has a control pad, a screen, a panel of input buttons, switches (e.g., toggle switch, multidirectional switch, etc.), or other control elements.

The mount 500 can be programmed to move the television between set positions using a remote control, activation elements, or other suitable input devices. In some embodiments, the television can be moved between a raised position and the user-set lowered position inputted using both activation elements 512a, 512b (collectively, "activation elements 512"). For example, when the television is at the desired lower position, a user can simultaneously press both activation elements 512 to cause that position to be stored by a storage element of the controller 506. When the television is in a raised position, the lower activation element 512b can be depressed, which causes the television to be moved to the user-set lower position. The upper activation element 512a can then be depressed to cause the television to be raised to the raised position. In some embodiments, the mount 520 has multiple control elements each corresponding to a preset position or state. The number of activation or control elements can be selected based on the desired number of settings.

The positioning mechanism 514 can further include one or more temperature sensors 518 capable of detecting the temperature of the surrounding environment. For example, if the sensor detects a temperature at or above a threshold temperature (e.g., a temperature that could cause damage to a television), the positioning mechanism 514 can command the counterbalancing mechanism 517 such that the mount 500 automatically raises the television away from, for example, the front of the fireplace. This allows televisions to be automatically moved away from heat sources that could cause damage to sensitive electronics. In some embodiments, the positioning mechanism 514 includes a thermometer or temperature gauge that displays the ambient temperature proximate to the television to warn users if the temperature is too high for the television to safely operate. In one embodiment, there is a radial thermometer, whereby a dial displays the current ambient temperature near the television to the user. In an alternative embodiment, there is a color changing temperature gauge. The color changing temperature gauge comprises a temperature sensitive material that changes color depending upon the ambient temperature. This enables viewing of the current temperature from a distance. In yet another alternative, the temperature gauge is a digital thermometer with an LCD display. The handle 511 also includes two padded portions. In addition to or as an alternative of a temperature gauge, the padded portions are made from color-changing, temperature-sensitive material. The composition of the material of the padded portions is such that it changes color at predetermined temperatures. For example, the padded portions may turn from black to red if the temperature is at or above the normal operating range of temperatures of flat panel televisions.

The sensor 518 can be configured to detect objects, track movement, or the like. In some embodiments, the sensor 518 includes a plurality of elements (e.g., proximity sensors, ultrasonic sensors, capacitive sensors, etc.) capable of outputting signals indicative of the detected values, conditions, etc. to identify the position of objects located along a path of travel. The controller 506 can receive the output from the sensor 518 to ensure that the mount 500 and/or television does not strike any objects. For example, the sensor 518 can detect the relative position between the television and another object and its output can be used to control the mount 500 to keep the television from contacting such object.

Sensors (e.g., force sensors, torque sensors, position sensors, etc.) and detection elements can be incorporated or coupled to components, such as joints, slides, actuators, etc. The number, positions, and functionality of the sensors can be selected based on the range of motion of the mount, degrees of freedom of the mount, installation location (e.g., near a heat source, near objects, etc.), and the like.

FIG. 17 shows an auto-straightening mechanism 522 positioned at a backside 523 of the vertical positioner mechanism 147. The auto-straightening mechanism 522 can help prevent the television from contacting the wall when the television is moved toward the stowed or retracted position. A user can move the television to a predetermined position (e.g., a generally parallel orientation with respect to the wall) before the auto-straightening mechanism 522 allows the mount 500 to be fully collapsed.

In some embodiments, the auto-straightening mechanism 522 can include a main body 525 and positioners 524a, 524b (collectively, "positioners 524"). Each positioner 524 can include an elongate arm 548 and a cam or roller 529. The arm 548 can be rotatably coupled to the body 525, and each roller 529 can be coupled to a free end of the arm 548. If the television is at a non-parallel orientation with respect to the mounting portion 133 and/or wall, one of the positioners 524 will contact a surface of the mounting portion 133 first and tend to cause the television to swivel toward a parallel orientation. The contacted positioner 524 can remain in a locked position until the vertical positioner mechanism 147 swivels, bringing the other positioner 524 into contact with the mounting portion 133. Once both positioners 524 contact a surface 527 of the mounting portion 133, the auto-straightening mechanism 522 releases the positioners 524 allowing the display mount 500 to be collapsed. The rollers 549 can roll along the surface 527 as the arms 548 rotate downwardly, as indicated by arrows, until the positioner mechanism 147 is near or against the surface 527. In some embodiments, the positioners 524 can rotate downwardly together (e.g., at the same or similar rate) to maintain the orientation of the television. In some embodiments, positioners 524 can be biased to gradually slow collapsing of the mount 500 as the mount 500 reaches the fully collapsed configuration. When the television is moved away from the wall, the positioners 524 can move from a downward position to the illustrated deployed or raised position. Once the positioners 524 reach the raised position, the auto-straightening mechanism 522 can be in a locked state again. The auto-straightening mechanism 522 allows the television to be swiveled and/or tilted when the television is at an extended or forward position.

Other types of auto-positioning mechanisms can be used. The configuration of the auto-straightening mechanism 522 can be adjusted by the user based on the size of the television. In some embodiments, the arms of the positioners 524 can be extended or contracted to adjust when the television is automatically rotated with respect to the wall. For example, lengths of the arms can be increased to automatically rotate relatively large TVs to avoid contact between the TV and the wall. Extendable arms can have threaded extenders or other features for adjusting arm lengths.

Auto-positioning mechanisms can be incorporated into other components of display mounts and can be operable to cause the mount or television to move to target positions, into orientations, along defined paths of travel, or the like. Additionally, the auto-positioning mechanisms can be adjusted by the user to define target orientations. For example, the auto-positioning mechanism 522 of FIG. 17 can be adjusted such that the positioners 524a, 524b are at different positions. The positioners 524a, 524b can contact the mounting portion 133 to keep the television and bracket at a nonparallel orientation with respect to the wall. In this manner, the auto-positioning mechanisms can help a user automatically position the television at a user-set target position, orientation, viewing angles, etc. In some embodiments, the auto-positioning mechanisms include one or more threaded position members (e.g., bolts, threaded rods, etc.) rotatable to set the target position. The position members can contact components to direct the television to a target position. The threaded position members can be carried by the television mounting portion or bracket, arms, or other components.

The mounting portion 133 can include one or more optional input features used for positioning. In some embodiments, the mounting portion 133 includes contact panels 526 configured to detect forces or pressure applied by the auto-straightening mechanism 522. The input can be used to lock, unlock, or control motorized components of the display mount 500. Other components of the display mount can include input features, sensors, or the like.

Further Embodiments of the Vertical Positioning Mechanism

Figure 18:
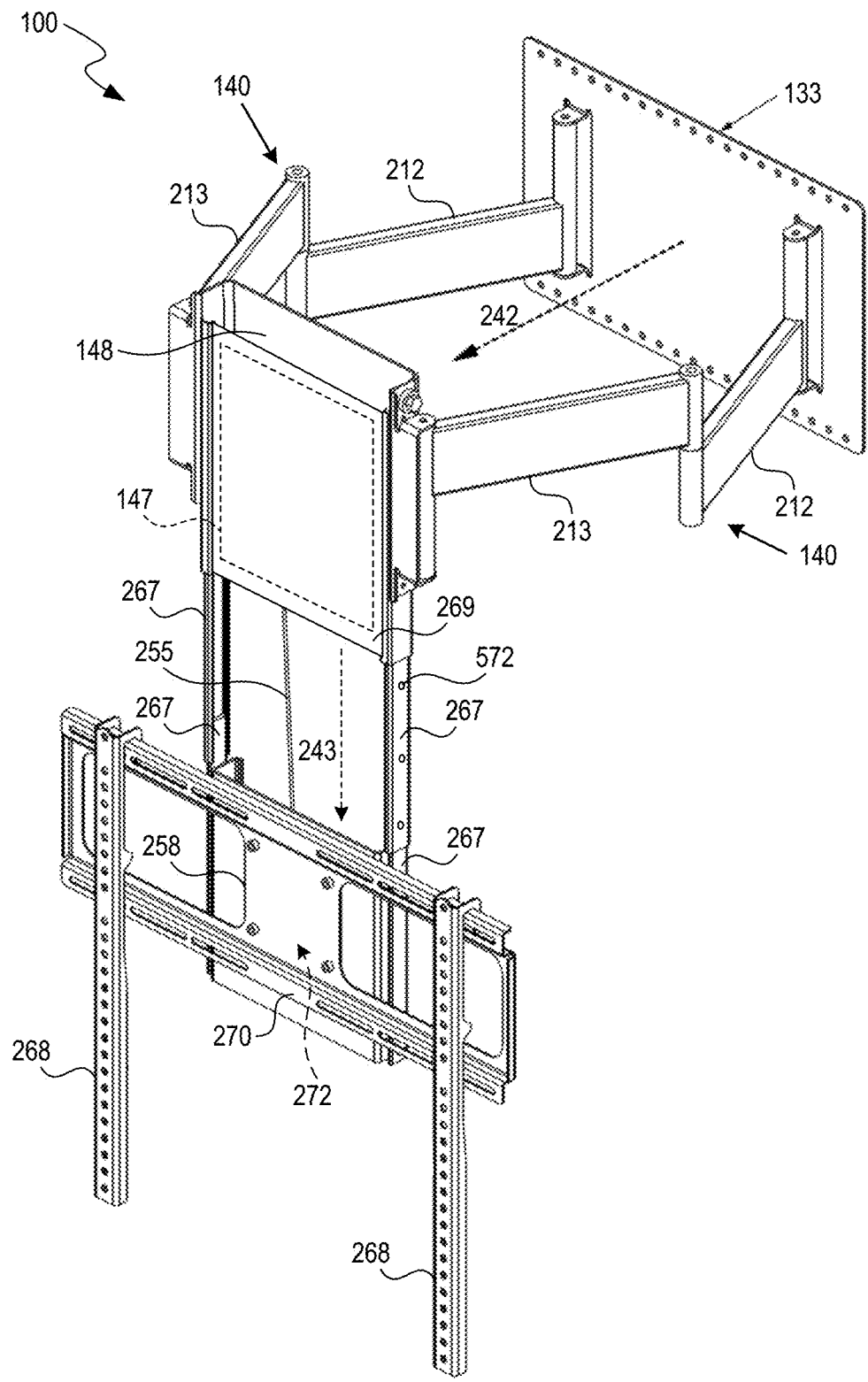
FIG. 18 is an isometric view of a multidirectional display mount with a pulley system in accordance with an embodiment of the technology.

FIG. 18 is an isometric view of the display mount 100 in accordance with some embodiments of the present technology. As discussed above with respect to FIGS. 1-4, the illustrated display mount 100 includes the mounting portion 133, the arms 140 (including the arms 212, 213) rotatably connected to the mounting portion 133, and the bracket 148 rotatably connected to the arms 140. The mounting portion 133 can be mounted to a wall or other suitable location. The arms 140 allow the TV mounting portion 258 to be moved linearly (e.g., horizontally) along the path 242, while the inclusion of arms 212, 213 into the arms 140 allows the TV mounting portion 258 to be rotated with respect to the mounting portion 133.

As further illustrated, the vertical positioner mechanism 147 (identified schematically in FIG. 18) is coupled to the bracket 148. The TV mounting portion 258 is coupled to the vertical positioner mechanism 147 through the extenders 267 and the connector 255. As discussed above, the vertical positioner mechanism 147 allows the TV mounting portion 258 to be moved vertically along the path 243. Accordingly, in the illustrated embodiment, the display mount 100 has at least three degrees of freedom. Additional embodiments of the vertical positioner mechanism 147 are discussed below with respect to FIGS. 19-38.

As further illustrated in FIG. 18, the TV mounting portion 258 is coupled to a bracket 270 with rails 268 that facilitate attaching a TV to the TV mounting portion 258. In some embodiments, the bracket 270 can be rotatably coupled to the TV mounting portion 258 along one or more axes (e.g., a horizontal axis and/or vertical axis). For example, the bracket 270 can include a pivot, joint (e.g., a ball joint), and/or hinge 272 providing at least one rotational degree of freedom. In some embodiments, the bracket 270 can be rotatably coupled to the arms 140, allowing the bracket to rotate along a horizontal axis and/or a vertical axis. Accordingly, in some embodiments, the display mount 100 can have four, five, or six degrees of freedom, thereby allowing a user to precisely position a television.

In some embodiments, the display mount 100 can include one or more frictional components, stops, locks, brakes, or other suitable motion inhibitors that can resist motion of any of the components, inhibit relative motion between components, and/or lock together components. In some embodiments, motion inhibitors can be used to lock the display mount 100 in a desired position. For example, the extenders 267 can include pin locks 572 that can lock the vertical motion of the vertical positioner mechanism 147. In some embodiments, the motion inhibitors can create a static force barrier to motion, such that small forces or imbalances do not cause movement of the components of the display mount 100. For example, as described with respect to FIG. 4, the vertical positioner mechanism 147 can rely on a balance between the forces from the TV mounting portion 258 and the components of the vertical positioner mechanism 147. The motion inhibitors can create a static force barrier that provides a margin of error to the balance (e.g., in order to move the vertical positioner mechanism 147, the imbalance must be greater than the static force barrier). The motion inhibitors can be adjustable to increase or decrease the amount of user applied force needed to move the television. In some embodiments, the motion inhibitors include rotatable inputs used to selectively increase or decrease the amount of force needed to move components. Motion inhibitors can be incorporated into the extenders 267, arms 140, pivots, swivels, auto-positioning mechanisms, etc.

Figure 19:
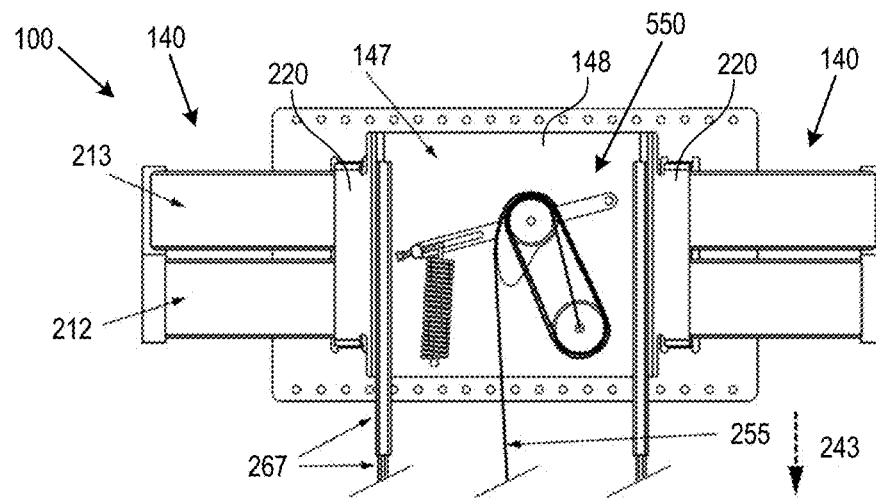
FIG. 19 is a front view of a pulley system of the display mount of FIG. 18 in accordance with an embodiment of the technology.
Figure 20:
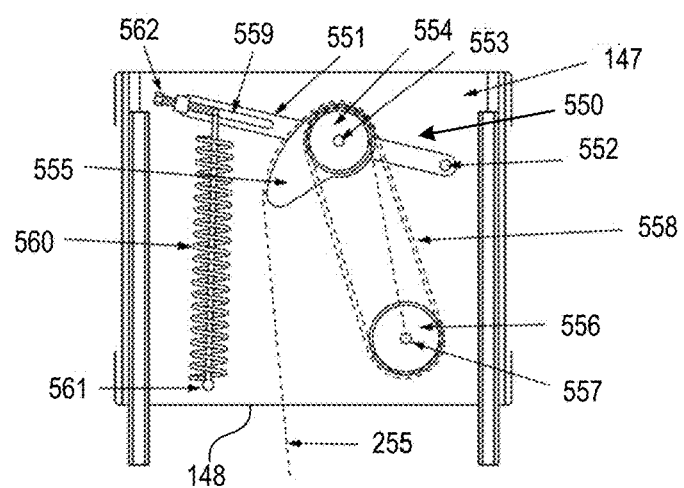
FIGS. 20 and 21 are front views of a pulley system in accordance with some embodiments of the present technology.
Figure 21:
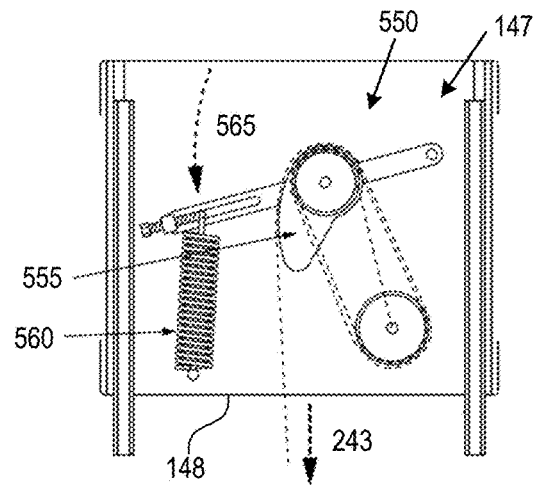

FIGS. 19-21 are front views of the vertical positioner mechanism 147 of the display mount 100 according to some embodiments of the present technology. (A removable front plate 269 of FIG. 18 is shown removed.) Referring now to FIG. 19, in the illustrated embodiment, the vertical positioner mechanism 147 includes the connector 255 and a biasing pulley system 550 ("pulley system 550").

FIGS. 20 and 21 illustrate additional details of the pulley system 550 with the television in raised and lower states, respectively. Referring now to FIG. 20, the vertical positioner mechanism 147 is carried by the bracket 148. The pulley system 550 includes the lever 551, a moveable upper pulley assembly 554 carried by the lever 551, a fixed lower pulley assembly 556 coupled to the upper pulley assembly 554 by the connector 255, and the compression or biasing element 560 coupled to the lever 551. The lever 551 is rotatably fixed to the bracket 148 via a pivot 552. The upper pulley assembly 554 is rotatably fixed to the lever 551 via a pivot or coupler 553. The lower pulley assembly 556 is rotatably fixed to the bracket 148 via a pivot 557. A first end of the biasing element 560 is rotatably fixed to the bracket 148 at pivot 561, while a second end is slidably fixed to the lever 551 within a slot 559 of the lever 551. For example, as illustrated in FIG. 20, the pulley system 550 can include an adjustment mechanism 562 (e.g., shown as a threaded member) positioned within the slot 559 and coupled to the second end of the compression element 560. As the adjustment mechanism 562 is moved, the position at which the compression element 560 couples to the lever 551 is adjusted. As described in more detail below, adjusting the position at which the compression element 560 couples to the lever 551 adjusts the counterbalancing force provided by the vertical positioner mechanism 147.

The upper pulley assembly 554 includes a cam 555 (e.g., a protruding element). The connector 255 extends (e.g., wraps) around the upper pulley assembly 554 and the lower pulley assembly 556 and includes a tackle portion 558. As a TV carried by the display mount 100 (e.g., FIG. 18) is lowered, the connector 255 is pulled downward, thereby drawing more of the connector 255 from the length of the tackle portion 558. As more of the connector 255 is pulled from the tackle portion 558, the connector 255 pulls the upper pulley assembly 554 toward the lower pulley assembly 556.

FIG. 20 shows the partially compressed biasing element 560 providing a force for counterbalancing the television in the raised position. The compressed biasing element 560 pushes upwardly to provide a counterbalancing force. FIG. 21 shows the fully compressed biasing element 560 for counterbalancing the television in the lowered position. The movement of the upper pulley assembly 554 toward the lower pulley assembly 556 causes the lever 551 to rotate along path 565, thereby compressing the biasing element 560. The compressed biasing element 560 pushes upwardly against the lever 551, which in turn applies an upwardly directed force to the pulley assembly 554. The connector 255 and the tackle portion 558 are arranged as a distance multiplier instead of a force multiplier. That is, the connector 255 winds around the pulleys in a "block and tackle" format. Accordingly, the distance that the connector 255 moves downward along path 243 is much greater than the rotation of the lever 551 along path 565.

As further illustrated in FIG. 20, when the compression element 560 is partially compressed or generally uncompressed, the lever 551 is positioned such that the cam 555 protrudes laterally outward (e.g., maximum lateral protrusion position). The connector 255 extends downwardly from the cam 555 at an angle. As the connector 255 pulls the lever 551 downward, the cam 555 rotates counterclockwise to move a tensioned section of the connector 255 toward a vertical orientation, as shown in FIG. 21. The decreasing lateral protrusion reduces the distance between the contact point of the connector 255 on the upper pulley assembly 554 and the pivot 552 that the lever 551 is rotatably connected to. The reduction in the distance, thereby decreases the torque applied by the connector 255 as the TV mounting portion is lowered. Simultaneously, the amount of compression of the biasing element 560 increases, which can increase the torque the compression element 560 applies upward on the lever 551. Accordingly, the pulley system 550 can provide a generally constant counterbalancing force for most or substantially all of the vertical travel of the television.

The percent variation of the counterbalancing force during operation can be at or below a threshold level. For example, the variation of the counterbalancing force can be equal to or less than 1%, 2%, 5%, or 10% for a predefined amount of television travel (e.g., at least 70%, 80%, 90%, 95%, or 100% of vertical travel). In other embodiments, the pulley system 550 can be configured to provide a varying counterbalancing force to, for example, slow movement of the television as the television nears the end of travel. The increase or decrease of counterbalancing forces can be set by the user based on the weight of the television, range of motion, and/or desired feel.

In some embodiments, the pulley system can be configured to allow the increasing force from the compression element 560 and the decreasing force of the connector 255 to cancel out. For example, the cam 555 can have a curved and/or tapered shape specifically designed to balance the opposing forces, such as torques. As such, the pulley system 550 can be configured to compensate for force variations during operation.

Further, the adjustment mechanism 562 can be used to adjust the position on which the compression element 560 applies force to the lever 551 to match the weight loaded on the TV mounting portion 258 and therefore the magnitude of the torque applied by the compression element 560. For example, the adjustment mechanism 562 can move the position closer to the pivot 552 to apply less torque on the lever 551 (e.g., for lighter TVs) or farther from the pivot 552 to apply more torque on the lever 551 (e.g., for heavier TVs). In some embodiments, the adjustment mechanism 562 can include increments that indicate the weight of the TV the compression element 560 will counterbalance. In some embodiments, the adjustment mechanism 562 can be a threaded member that can be screwed farther along the slot 559 using basic tools (e.g., a wrench, screw driver, or other suitable tool).

As a result of the balanced torques, the constant weight of a TV carried by the TV mounting portion 258 (FIG. 18) can be counterbalanced with a constant and equal force from the pulley assembly, allowing a user to raise and lower the TV mounting portion 258 with constant, minimal effort.

In various embodiments, the compression element 560 can be a mechanical spring, a gas spring, an air compression spring, or any other suitable means of mechanical compressive force. In some embodiments, the compression element 560 can include an element that provides mechanical extension force on the lever 551 from the opposite direction of the illustrated compression element 560 (e.g., pulls upward on the lever 551). In some embodiments, the compression element 560 can include an electronic, motorized actuator that moves the lever 551 up or down. As a result, the compression element 560 can be a driving force instead of a driven force, while the connector 255 will still raise and lower in similar fashion. In embodiments including an electronic, motorized actuator, the vertical positioner mechanism 147 can include an electronic module, a remote control, a power supply, and/or a software module to control the motorized actuator.

As described above, in some embodiments, the vertical positioner mechanism 147 can include one or more motion inhibitors that can resist and/or lock the motion of the vertical positioner mechanism 147 altogether. In some embodiments, the motion inhibitors can be used to lock the display mount 100 in a desired position. In some embodiments, the motion inhibitors can be used to create a static force barrier to motion, such that small imbalances do not cause the components of the display mount 100 to move. The motion inhibitors can create a static force barrier that provides a margin of error to the balance (e.g., in order to move the vertical positioner mechanism 147, the imbalance must be greater than the static force barrier). In some embodiments, the motion inhibitors can be included in the upper pulley assembly 554, the pivot 553, the lower pulley assembly 556, the pivot 557, the pivot 552, and/or in any other suitable component (FIG. 20). For example, the upper pulley assembly 554 can include a frictional force that creates a static force barrier before the vertical positioner mechanism 147 can be pulled downward or raised.

Figure 22:
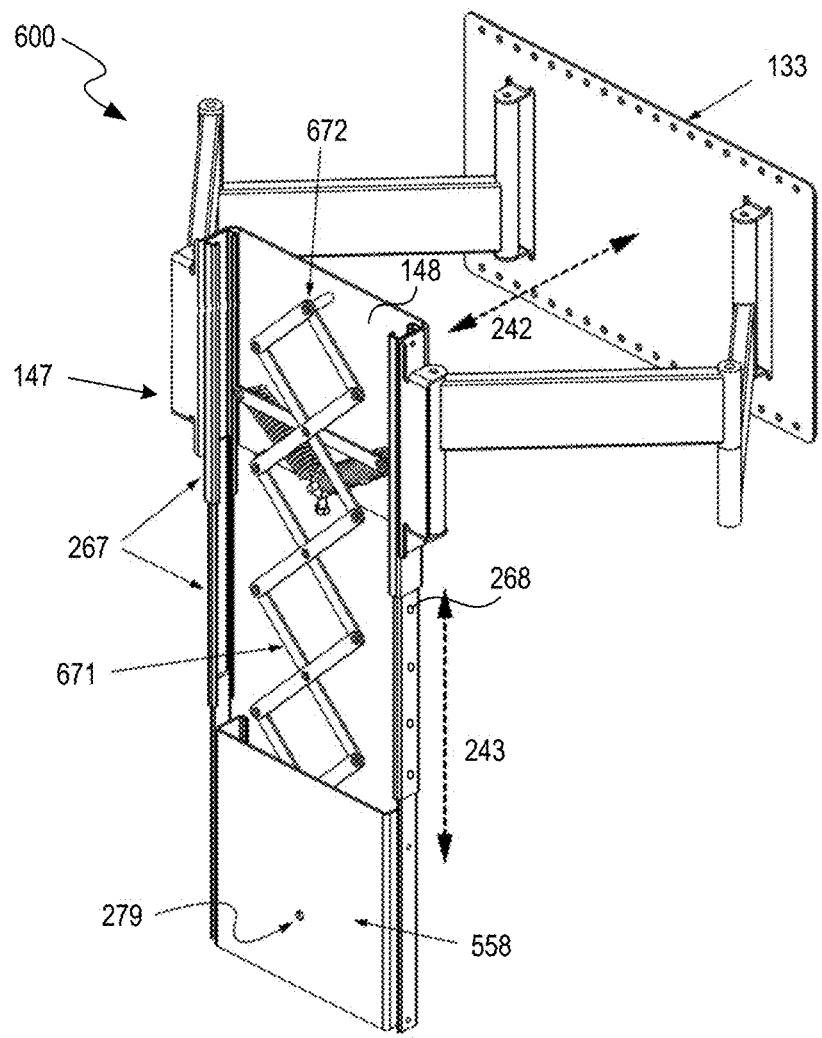
FIGS. 22 and 23 illustrate a mounting system with a vertical positioner mechanism configured in accordance with some embodiments of the present technology.
Figure 23:
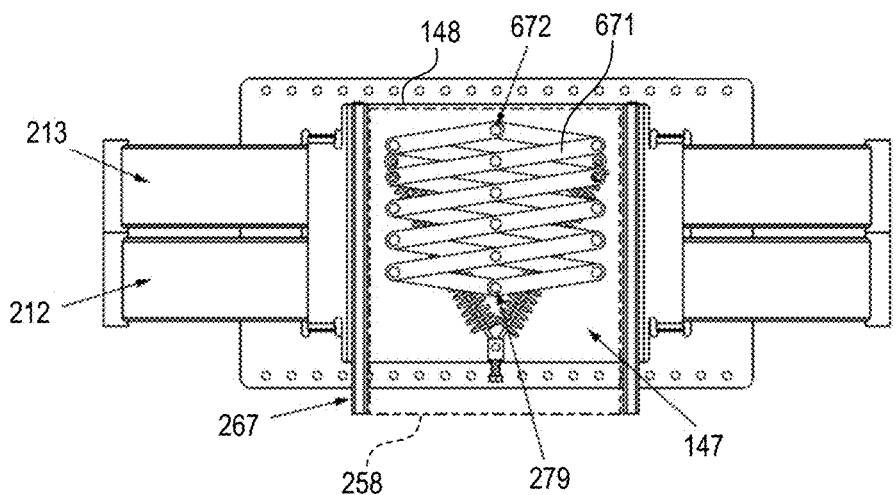

FIGS. 22-28 illustrate the mounting system 600 with the vertical positioner mechanism 147 configured in accordance with further embodiments of the present technology. As illustrated in FIGS. 22 and 23, the vertical positioner mechanism 147 includes a scissor assembly 671 rotatably coupled to the bracket 148 of the mounting system 600 at a pivot 672 and rotatably coupled to the TV mounting portion 258 at pivot 279. As described in more detail below, the scissor assembly 671 can provide the counterbalancing force to offset the weight of the TV attached to the TV mounting portion 258. As a result, a user can move the TV mounting portion 258 vertically along the path 243 with minimal effort. The movement of the mounting portion 258 transitions the vertical positioner mechanism 147 between an expanded configuration (FIG. 22) and a contracted configuration (FIG. 23), thereby expanding and contracting the scissor assembly 671.

FIGS. 24-27 illustrate additional details of the vertical positioner mechanism 147 of FIGS. 22 and 23 in accordance with some embodiments of the present technology. FIGS. 24 and 25 are front and rear views, respectively, of a portion of the vertical positioner mechanism 147 in the collapsed configuration. As illustrated, the scissor assembly 671 is attached to the bracket 148 at pivot 672. The vertical positioner mechanism 147 also includes a force arm or bracket 673 and compression elements 675. The force bracket 673 is rotatably fixed to the scissor assembly 671. The compression elements 675 each have a first end moveably fixed to a compression mount 676 carried by the bracket 148 and a second end rotatably connected to the force bracket 673 at a pivot 674. The compression mount 676 includes an adjustment mechanism 677 that can adjust the vertical position of the compression mount 676, thereby adjusting a pre-compression of the compression elements 675. In the illustrated embodiment, each pivot 674 is positioned equidistantly relative to distal ends of the force bracket 673. In other embodiments, the pivots 674 can be located at non-equidistant positions and/or at other increments along the force bracket 673. In some embodiments, the position of the pivots 674 can be adjusted to increase or decrease the pre-compression of the compression elements 675 and/or the angle of the compression elements 675.

FIGS. 26 and 27 are front and rear views, respectively, of a portion of the vertical positioner mechanism 147 in the expanded configuration. As illustrated in FIGS. 24 and 25, the distance between the connection between the pivot 672 and the connection to the force bracket 673 (e.g., the distance between the pivot 672 and the pivot 678) is much less than the distance between the pivot 672 and the connection to the TV mounting portion 258 (e.g., the distance between the pivot 672 and the pivot 279). As a result, the scissor assembly 671 has more expanding portions between the pivot 672 and the pivot 279 than between the pivot 672 and the pivot 678. As illustrated in FIGS. 26 and 27, the result is that the pivot 279 travels multiple times further than pivot 678 when the scissor assembly 671 is expanded to move the TV mounting portion 258 (FIG. 24) vertically downward. For example, the TV mounting portion 258 can move a few feet while the force bracket 673 moves only a few inches. As further illustrated in FIGS. 26 and 27, the movement of the force bracket 673 compresses the compression elements 675, thereby increasing the magnitude of the overall force delivered by the compression elements 675. As described in more detail below, the movement of the force bracket 673 also causes the compression elements 675 to rotate, reducing the magnitude of the vertical component of the force delivered by the compression elements 675.

Figure 28:
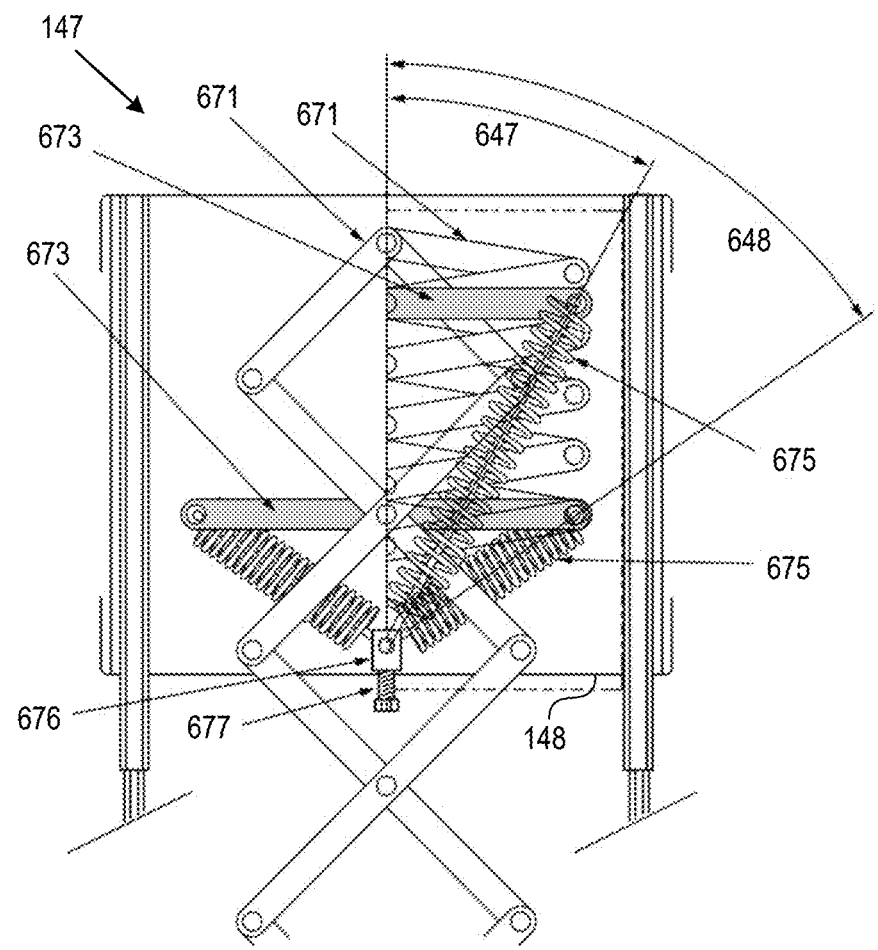

FIG. 28 illustrates a split overlay of the vertical positioner mechanism 147 in the expanded configuration and the collapsed configuration. As illustrated, the compression elements 675 push upward against the force bracket 673 at an angle, splitting the overall force delivered by the compression elements 675 into a vertical component and a horizontal component. The angle varies as the scissor assembly 671 is expanded and the compression elements 675 rotate. For example, the compression elements 675 push upward against the force bracket 673 at a first angle 647 when the vertical positioner mechanism 147 is in the collapsed configuration and push upward against the force bracket 673 at a second angle 648 when the vertical positioner mechanism 147 is in the expanded configuration.

As illustrated, the first angle 647 is directed more upwards than the second angle 648. As a result, the vertical component of the force from the compression elements 675 is larger when the vertical positioner mechanism 147 is in the compressed state compared to the expanded state. That is, the compression elements 675 apply a higher percentage of the overall force in the vertical direction when the vertical positioner mechanism 147 is in the compressed state. Simultaneously, however, the compression elements 675 compress as the vertical positioner mechanism 147 moves toward the expanded state (e.g., as the vertical positioner mechanism 147 is extended downward). As a result, the magnitude of the overall force from the compression elements 675 increases as the vertical positioner mechanism 147 moves toward the expanded state. In some embodiments, the magnitude of the vertical component of the upwards force can remain constant. For example, the rotation of the compression elements 675 can be configured such that the change in the magnitude of the overall force compensates for the change in the percentage directed into the vertical component. The end result is that the constant weight of the TV is counterbalanced with a constant and equal vertical force from the compression elements 675, allowing a user to raise and lower the TV mounting portion 258 (FIG. 22) with minimal effort.

Further, the adjustment mechanism 677 can be used to adjust the position of the compression mount 676 and therefore the position of the lower end of the compression elements 675. A user can adjust the position of the compression mount 676 to calibrate the system for the weight of the TV. The compression mount 676 can be moved upward to increase the pre-compression of the compression elements 675 and therefore increase the vertical force delivered by the compression elements 675 for a heavier TV. Conversely, the compression mount 676 can be moved downward to reduce the pre-compression of the compression elements 675 and therefore decrease the vertical force delivered by the compression elements 675 for a lighter TV.

In various embodiments, the compression elements 675 can be mechanical springs, gas springs, air compression springs, or any other suitable means of providing a constant or varying mechanical compressive force. In some embodiments, the compression elements 675 can include an element that supplies a mechanical extension force from the opposite direction of the illustrated elements (e.g., pulls upward on the force bracket 673). In some embodiments, the compression elements 675 can include an electronic, motorized actuator that moves the force bracket 673 up and down. That is, the compression elements 675 can provide a driving force instead of a driven force, while the scissor assembly 671 raises and lowers in similar fashion. In some such embodiments, the vertical positioner mechanism 147 can include an electronic module, a remote control, a power supply, and/or a software module to control the motorized actuator.

As described above, in some embodiments, the vertical positioner mechanism 147 can include one or more motion inhibitors that can resist and/or lock the motion of the vertical positioner mechanism 147 altogether. In some embodiments, the motion inhibitors can be used to lock the display mount 100 in a desired position. In some embodiments, the motion inhibitors can be used to create a static force barrier to motion, such that small imbalances do not cause the components of the display mount 100 to move. For example, the motion inhibitors can create a static force barrier that provides a margin of error to the balance (e.g., in order to move the vertical positioner mechanism 147, the imbalance must be greater than the static force barrier). In some embodiments, the motion inhibitors can be included in the pivot 672 (FIG. 24), any of the joints in the scissor assembly 671, in the pin locks, in the pivots 674, and/or in any other suitable component. For example, the joints of the scissor assembly 671 can each include a friction source that creates a small static force barrier.

Figure 29:
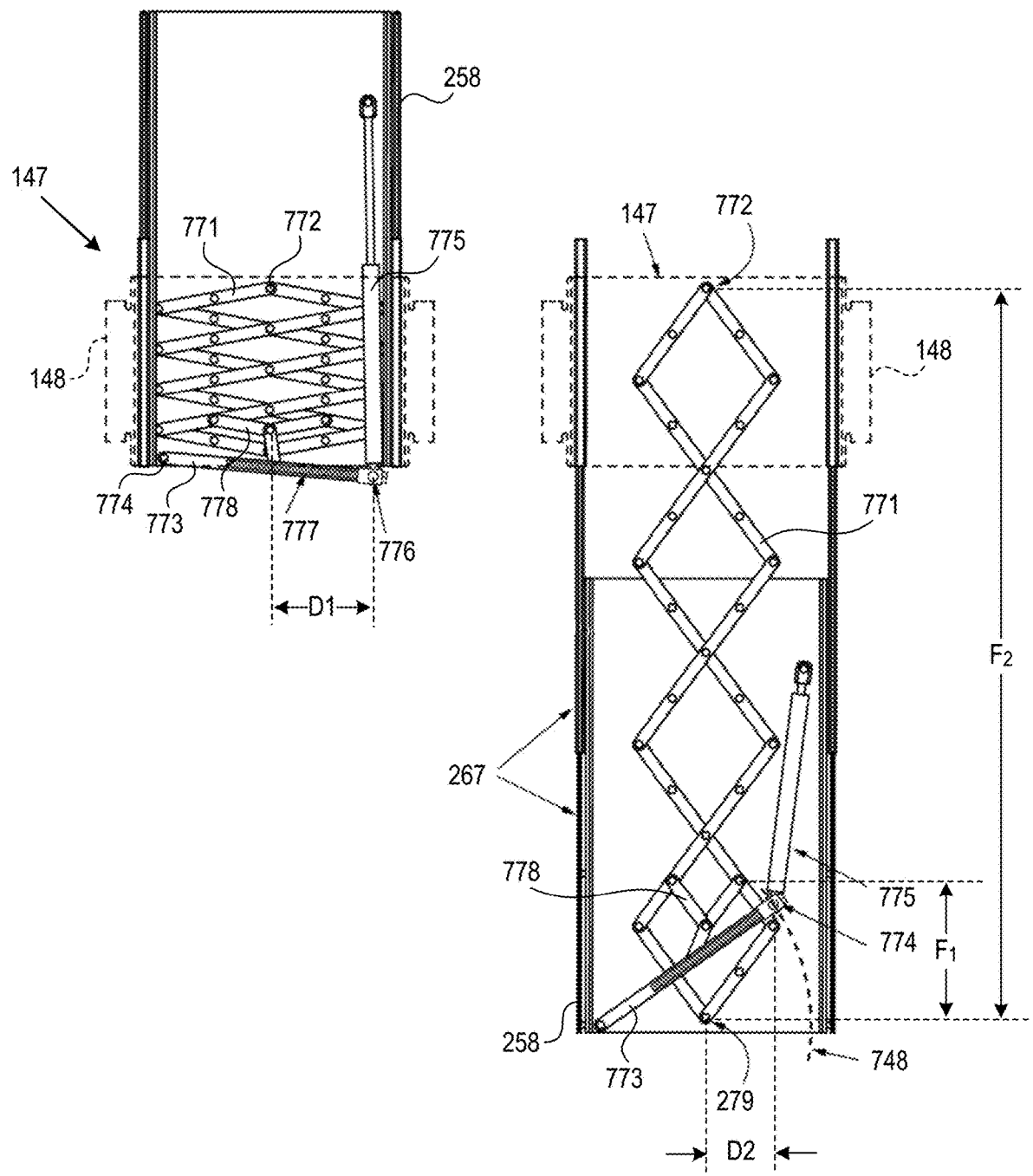
FIG. 29 illustrates an alternative embodiment of the vertical positioner mechanism of the type shown in FIG. 22 in accordance with some embodiments of the present technology.

FIG. 29 illustrates an alternative configuration of a vertical positioner mechanism 147 with a scissor assembly in accordance with some embodiments of the present technology. In the illustrated embodiment, the vertical positioner mechanism 147 includes a scissor assembly 771, a force bracket 773, a compression element 775, a compression mount 776, and a force adjustment mechanism 777. Like the embodiments discussed above, the scissor assembly 771 is rotatably attached to the bracket 148 at a pivot 772. However, in the illustrated embodiment, the compression element 775 is attached to the TV mounting portion 258 rather than the bracket 148. Similarly, the force bracket 773 is rotatably attached to the TV mounting portion 258 at pivot 774 and rotatably attached to the scissor assembly 771 by a pivotable y-bracket 778. The compression mount 776 is carried by the force bracket 773 at a position adjusted by the force adjustment mechanism 777. The compression element 775 is rotatably attached to the compression mount 776.

The weight from a TV in the TV mounting portion 258 pushes the scissor assembly 771 to expand, resulting in the y-bracket 778 applying an upward force on the force bracket 773. The upward force generates a first torque on the force bracket 773. Conversely, the force from compression element 775 pushes downward on the force bracket 773, generating a second torque on the force bracket 773. The second torque results in a pulling force on the y-bracket 778. The pulling force on the y-bracket forces a first segment F1 of the scissor assembly 771 toward a collapsed configuration, thereby forcing an overall segment F2 of the scissor assembly 771 toward the collapsed configuration. Accordingly, the downward force of the compression element 775 can compensate for the weight of the TV carried by the TV mounting portion 258.

As the TV mounting portion 258 moves downward, the compression element 775 compresses, resulting in an increase to the magnitude of the overall force applied by the compression element 775. However, the force bracket 773 also rotates along path 748, thereby reducing the distance between a first vertical axis aligned with the compression element 775 and a second vertical axis aligned with the y-bracket 778 from a first distance D1 to a second distance D2. The reduction in the distance between the first vertical axis and the second vertical axis reduces the torsional radius of the force from the compression element 775, thereby compensating for the increase in the magnitude of the overall force from the compression element 775. That is, the reduction in the distance effects the magnitude of the force that is translated through the torque on the force bracket 773 to force the y-bracket toward the closed configuration.

In some embodiments, the magnitude of the translated force can remain constant. For example, the rotation of the force bracket 773 can be configured such that the change in distance compensates for the change in the magnitude of the overall force. The end result is that the constant weight of the TV is counterbalanced with a constant and equal vertical force from the compression element 775, allowing a user to raise and lower the TV mounting portion 258 with minimal effort.

Further, the adjustment mechanism 777 can be used to adjust the position of the compression mount 776 and therefore the minimum distance between the first vertical axis and the second vertical axis. A user can adjust the position of the compression mount 776 to calibrate the system for the weight of the TV. For example, the compression mount 776 can be moved farther from the first vertical axis to increase the minimum distance and therefore increase the torque on the force bracket 773 for a heavier TV. Conversely, the compression mount 776 can be moved closer to reduce the minimum distance and therefore decrease the torque on the force bracket 773 for a lighter TV.

In various embodiments, the compression element 775 can include, without limitation, one or more mechanical springs, gas springs, air compression springs, or any other suitable means of providing mechanical compressive force. In some embodiments, the compression element 775 can include an element that supplies a mechanical extension force from the opposite direction of the illustrated elements (e.g., pulls downward on the force bracket 773). In some embodiments, the compression element 775 can include an electronic, motorized actuator that moves the force bracket 773 up and down. That is the compression element 775 can provide a driving force instead of a driven force, while the scissor assembly 771 raises and lowers in similar fashion. In some such embodiments, the vertical positioner mechanism 147 can include an electronic module, a remote control, a power supply, and/or a software module to control the motorized actuator.

As described above, in some embodiments, the vertical positioner mechanism 147 can include one or more motion inhibitors that can resist and/or lock the motion of the vertical positioner mechanism 147 altogether. In some embodiments, the motion inhibitors can be used to lock the display mount 100 in a desired position. In some embodiments, the motion inhibitors can be used to create a static force barrier to motion, such that small imbalances do not cause the components of the display mount 100 to move. For example, the motion inhibitors can create a static force barrier that provides a margin of error to the balance (e.g., in order to move the vertical positioner mechanism 147, the imbalance must be greater than the static force barrier). In some embodiments, the motion inhibitors can be included in the pivot 772, any of the joints in the scissor assembly 771, in the extenders 267 (FIG. 18), in the pivots 774, and/or in any other suitable component. For example, the joints of the scissor assembly 771 can each include a friction source that creates a small static force barrier.

Further Embodiments of the Display Mount

Figures 30, 31:
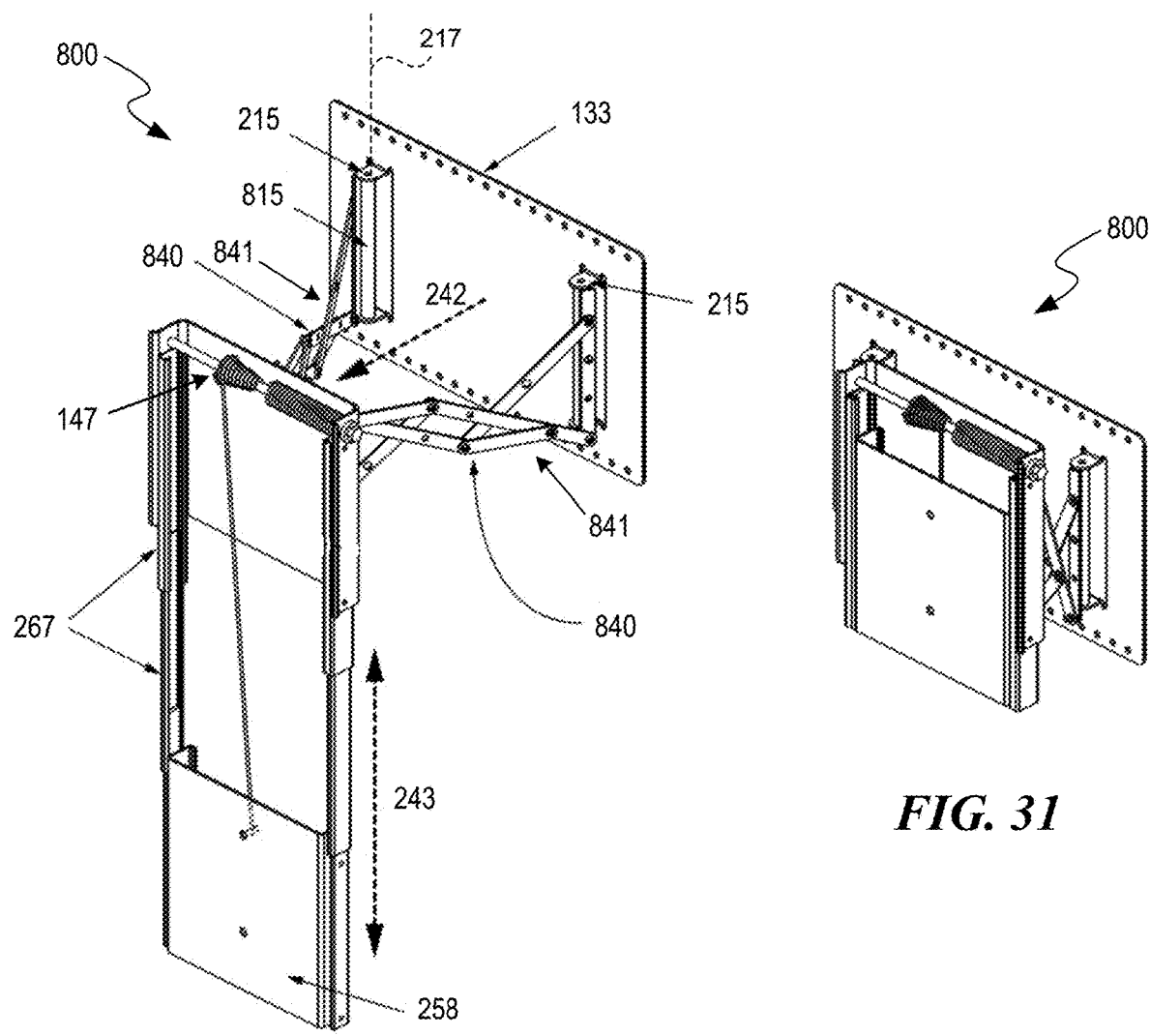
FIGS. 30-38 illustrate a display mount with further embodiments of expanding extenders in accordance with some embodiments of the present technology.

FIGS. 30-38 illustrate a display mount 800 in accordance with some embodiments of the present technology. FIG. 30 illustrates the display mount 800 in a fully expanded configuration and FIG. 31 illustrates the display mount 800 in a fully collapsed configuration. As illustrated in FIGS. 30 and 31, the display mount 800 is generally similar in structure and function to the display mount 100 discussed above with respect to FIG. 4. For example, the display mount 800 includes a mounting portion 133, the TV mounting portion 258, the vertical positioner mechanism 147 coupled to the TV mounting portion 258, and the extenders 267 coupled to the TV mounting portion 258 and the vertical positioner mechanism 147. In the illustrated embodiment, however, the display mount 800 includes arms 840 in place of the arms 140 (FIG. 4). As illustrated in FIG. 30, the arms 840, each of which includes scissor assembly 841, expand to move the TV mounting portion 258 along the path 242. In some embodiments, as discussed in more detail below, the scissor assembly 841 can also expand to move the TV mounting portion 258 at least partially in the vertical direction along the path 243. The scissor assembly 841 in each of the arms 840 can provide more strength to the display mount 800. For example, each linkage in the scissor assembly 841 is rotatably coupled to another linkage at permanent joints. The permanent joints may be more stable than slidable connections.

As illustrated in FIG. 30, each of the arms 840 is coupled to a hinge 815 that is rotatably coupled to the pivots 215 to allow the hinge to rotate about the axis 217. As the scissor assembly 841 in each of the arms 840 expands, the arms 840 rotate on the hinge 815 along the axis 217.

Figure 32:
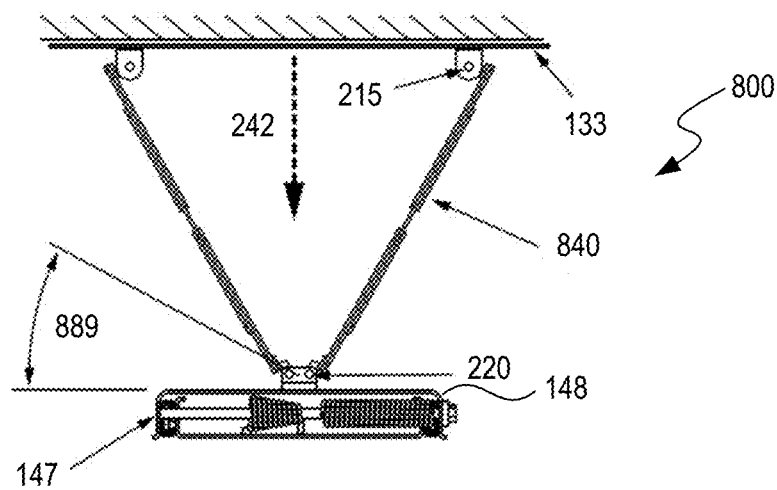
Figure 33:
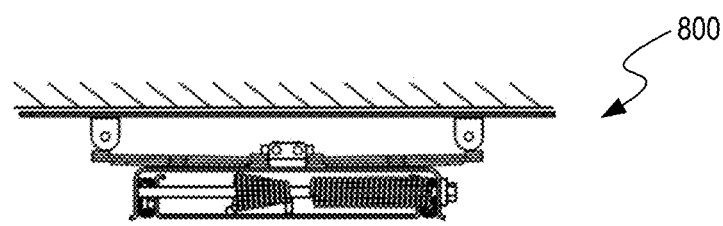

FIGS. 32 and 33 are top views of the display mount 800 in the expanded configuration and the collapsed configuration, respectively, in accordance with some embodiments of the present technology. As illustrated in FIG. 32, the arms 840 are rotatably coupled to a pivot 220 on the bracket 148. The pivot 220 is attached to the bracket 148, thereby linking the arms to the vertical positioner mechanism 147 and the TV mounting portion 258 (FIG. 30). Similar to the rotation discussed above, as the scissor assembly 841 in each of the arms 840 expands, the arms 840 rotate on the pivots 220. In some embodiments, the pivots 220 can also allow the bracket 149 to rotate along path 889, relative about a vertical axis, before, while, and/or after the arms 840 are expanded.

In some embodiments, each of the arms 840 can include multiple scissor assemblies 841, thereby increasing the strength of the display mount 800. In embodiments in which each arm 840 has more than one scissor assembly 841, the pivots 220 can be positioned close together near a horizontal center on the bracket 148 to provide clearance for the bracket 148 to rotate along the path 889.

Figure 34:
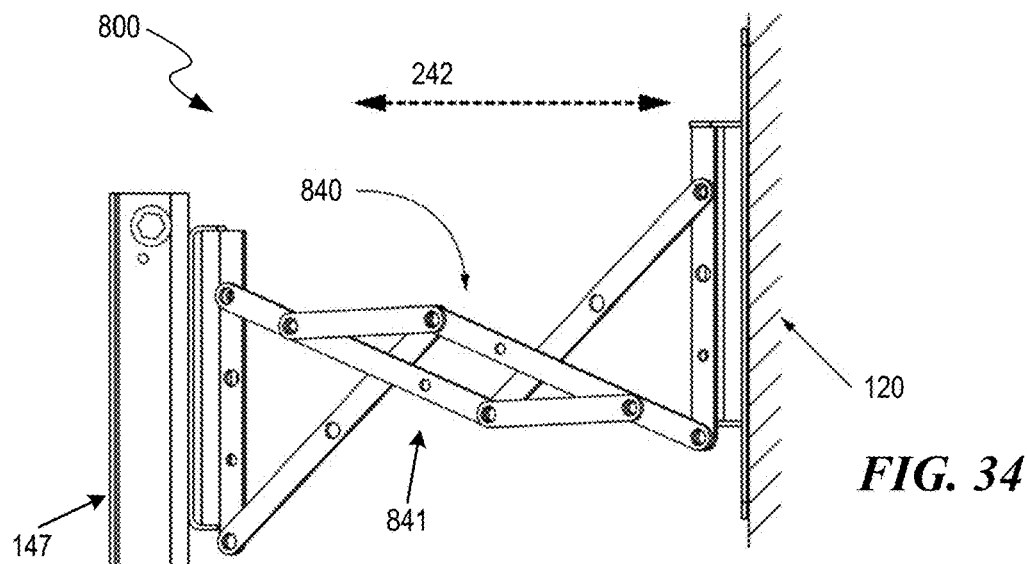

FIGS. 34-38 are side views of the arms 840 of the display mount 800 in accordance with some embodiments of the present technology. FIG. 34 illustrates the display mount 800 in a fully expanded configuration. That is, as illustrated, the arms 840 and the vertical positioner mechanism 147 have been fully expanded to move the TV mounting portion 258 along the paths 242, 243. In the illustrated embodiment, the arms 840 include a specialized scissor assembly 841 that moves the TV mounting portion 258 along both paths 242, 243 as it expands.

Figure 35:
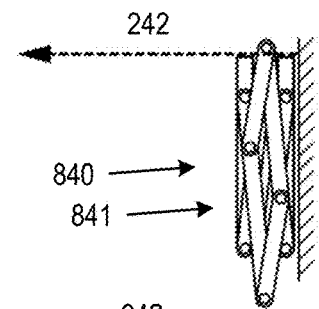
Figure 36:
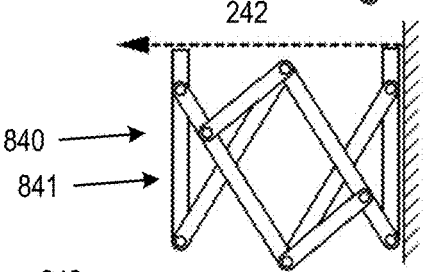

FIGS. 35-38 illustrate the expansion of the scissor assembly 841 in accordance with some embodiments of the present technology. As illustrated in FIGS. 35 and 36, the scissor assembly 841 can expand a predetermined distance horizontally along path 242 before any vertical motion occurs. In some embodiments, the predetermined distance can be selected to avoid unintended collisions between the TV (and/or the TV mounting portion 258) and a mantel or other object the display mount 800 is mounted above. In some embodiments, the predetermined distance can be about 2 inches, about 6 inches, about 12 inches, about 20 inches, or any other suitable distance.

Figure 37:
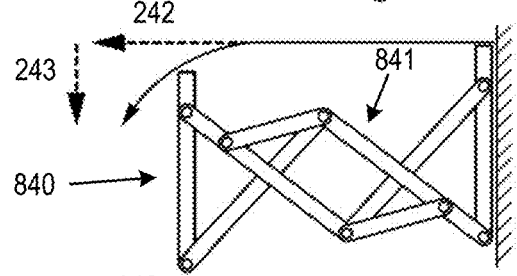
Figure 38:
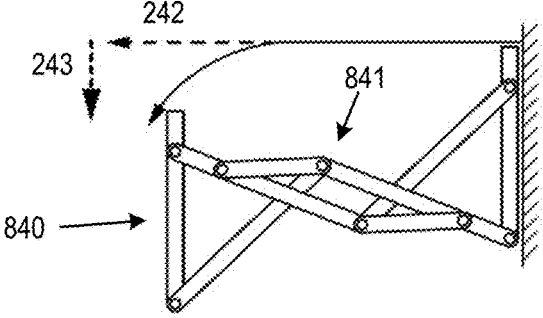

After the predetermined distance, the scissor assembly 841 can begin to expand vertically along the path 243 in addition to, or instead of, horizontally along the path 242. As illustrated in FIGS. 37 and 38, for example, the scissor assembly 841 can expand along an arcuate path 246 with components in both the horizontal and vertical directions until it reaches full expansion.

In some embodiments, electronic, motorized actuators can be attached to drive the extension and retraction of the arms 840. In these embodiments, the display mount 800 can include an electronic module, a remote control, a power supply, and/or a software module to control the motorized actuators.

Figure 39:
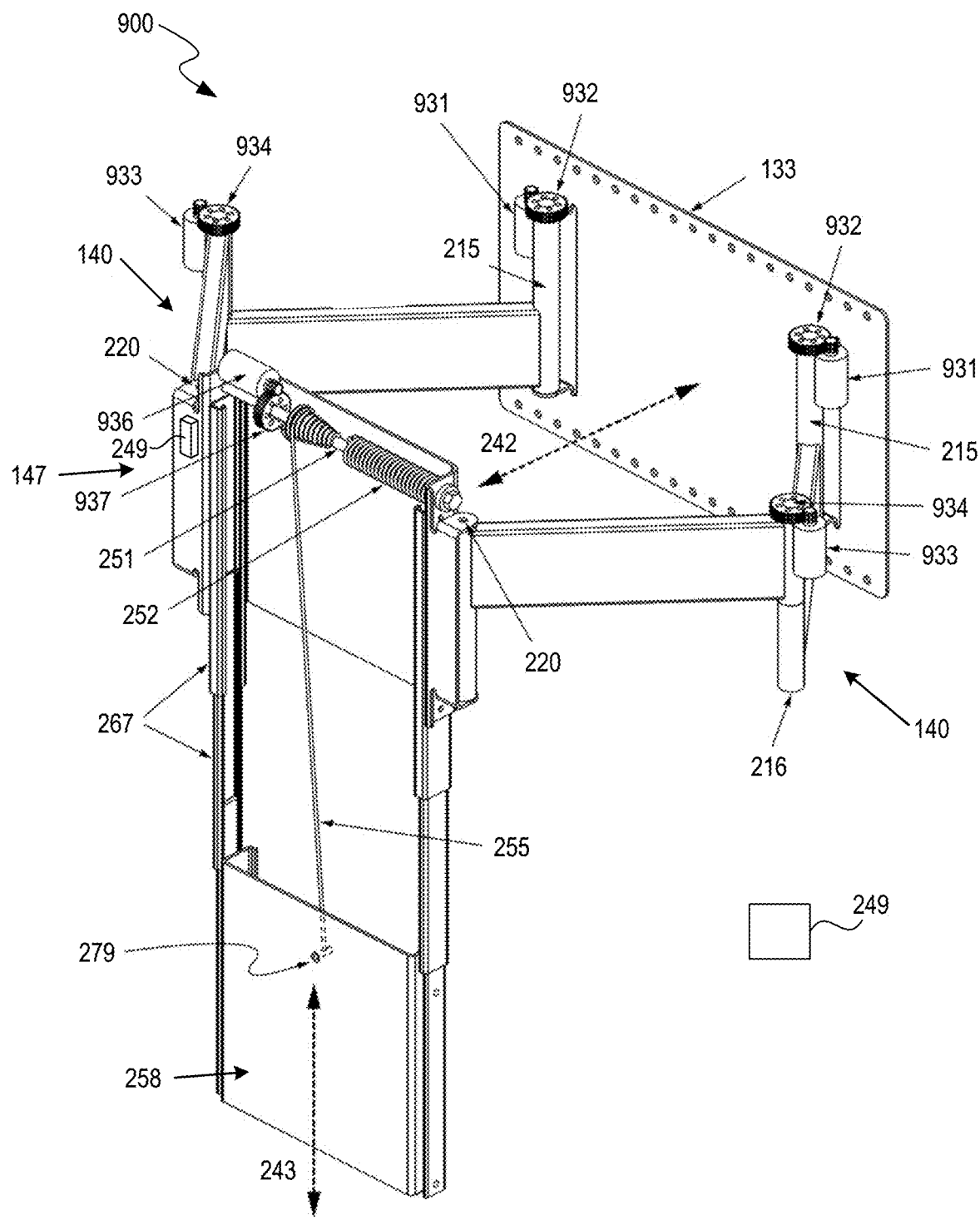
FIG. 39 is an isometric view of a motorized display mount in accordance with further embodiments of the present technology.

FIG. 39 is an isometric view of a display mount 900 in accordance with further embodiments of the present technology. As illustrated in FIG. 39, the display mount 900 is generally similar in structure and function to the display mount 100 discussed above with respect to FIG. 4. For example, the display mount 900 includes the mounting portion 133, the arms 140 rotatably coupled to the mounting portion 133, the vertical positioner mechanism 147 rotatably coupled to the arms 140, the TV mounting portion 258 coupled to the vertical positioner mechanism 147, and the extenders 267 coupled to the TV mounting portion 258 and the vertical positioner mechanism 147. In the illustrated embodiment, however, the display mount 900 is fully automated through electronic actuators at each of the rotatable joints.

As illustrated, rotating gears 932 are affixed to the arm 140 at the pivot 215 to automate the motion of the arms 140 toward or away from the mounting portion 133. The rotating gears 932 are operably connected to motors 931 to drive the rotating gears 932. The motors 931 are operably coupled to a power supply (not shown) and a controller 249. Similarly, rotating gears 934 are affixed to the arm 140 at the pivot 216 to further automate the motion of the arms 140. The rotating gears 934 are operably connected to motors 933 to drive the rotating gears 934. The motors 933 are operably coupled to a power supply (not shown) and a controller 249. The two sets of motors and gears can position the TV mounting portion 258 a desired horizontal distance from the mounting portion 133. In some embodiments, each of the motors and gears can be driven independently. As a result, the motors and gears can, for example, position the TV mounting portion 258 at a desired distance from the mounting portion 133 and/or at a desired angle with respect to the mounting portion 133. In some embodiments, rotating gears and motors can be affixed to the arms 140 at the pivot 220 instead of the pivot 215 or the pivot 216. In some embodiments, rotating gears and motors can be affixed to the arms 140 at the pivot 220 in addition to the pivot 215 or the pivot 216.

As further illustrated in FIG. 39, the display mount 900 also includes a rotating gear 937 affixed to the torsion shaft 251 to raise or lower the TV mounting portion 158 along the path 243. The rotating gear 937 is operably connected to motor 936 to drive the rotating gear 937. The motor 936 is operably coupled to a power supply (not shown) and a controller 249. In the illustrated embodiment, the motor 936 is aided by the torsion spring 252, for example, as discussed above with respect to FIG. 10.

The controller 249 can be attached to the display mount 900 and/or can be a separate component (e.g., a remote) in communication with each of the motors 931, 933, 936. In some embodiments, the controller 249 can include a memory device that can store presets for the display mount 900. A user can set a preset by moving the display mount 900 into the desired configuration and saving the configuration in the memory. The user can then operate the controller 249 to select the preset and quickly move the display mount 900 back into the desired configuration. In some embodiments, the display mount 900 can include one or more sensors (not shown) operably connected to the controller 249. The sensors can send object-detection signals to the controller 249. The controller 249 can then use the object-detection signals to avoid running into objects during expansion or contraction of the display mount 900. For example, as the arms 140 expand, the controller 249 can use the object-detection signals to stop expansion if an object is detected in front of the display mount 900.

In some embodiments, the display mount 900 can include extensions (not shown) with telescoping extenders and a handle at the bottom of the TV mounting portion 258. The handle can contain the controller 249 and/or one or more switches/control buttons that can operate the motors 932, 934, 936 in either direction. In some embodiments, the handle can include one or more sensors (e.g., force sensors, touch sensors, or any other suitable sensors). For example, when the handle is pushed upward, the motor 936 can activate to lift the TV; when the handle is pulled downward, the motor 936 can activate to lower the TV.

Mounting Technology

The television mount devices disclosed herein can be mounted on different support structures, including the outside of the wall, inside the wall, or any other suitable mounting location. For example, the television mount device of FIGS. 1 and 2 can be mounted to structural elements (e.g., studs, blocking, columns, etc.) within the wall 120 using fasteners, such as screws (e.g., mason screws, wood screws, etc.), bolts, anchors (e.g., sleeve anchors, wedge anchors, etc.), or the like. Mason screws or anchors can be used to mount the mount device to brick walls. Television mount devices can also be configured to be partially or completely positioned within support structures as discussed in connection with FIGS. 40-42 and can be oriented to raise/lower televisions, move televisions horizontally, or the like.

FIG. 40 is a side view of a partially recessed television mount device 1000 in accordance with embodiments of the technology. The television mount device 1000 can include a mounting portion or bracket 1002 ("mounting bracket 1002"), a connector assembly 1004, and a television bracket 1006. The connector assembly can include the vertical positioner mechanism, extender assemblies, dynamic components, or the like. The one-piece or multipiece mounting bracket 1002 can include one or more housings 1010 (e.g., recess boxes, braces, etc.), connectors 1012, fasteners, sensors (e.g., position sensors, contact sensors, temperature sensors, water sensors, etc.), conduits (e.g., tubes for wiring), power supplies, or combinations thereof. At least a portion of the connector assembly 1004 can be received within an interior space 1014 of the mounting bracket 1002. The interior space 1014 can be defined between an imaginary plane along a front surface 1015 of the wall 120 and a back wall 1016 of the housing 1010. When the television mount device 1000 is moved to the stowed position, at least a portion of the connector assembly 1004, illustrated as a cantilever arm, can be moved into the interior space 1014. The connector assembly 1004 can be or include an actuation apparatus (e.g., actuation apparatus 146 of FIG. 4), scissor assembly, collapsible arm assembly, etc.

FIGS. 41 and 42 are elevation views of recessed television mount devices in stowed positions in accordance with embodiments of the technology. Referring now to FIG. 41, a television mounting system 1020 can include a mounting portion or bracket 1022 ("mounting bracket 1022"), a connector assembly 1024, and a television bracket 1029. In the first or raised position, the television bracket 1029 can be completely received within an interior space 1028 of the mounting bracket 1022. The mounting bracket 1022 can include, without limitation, a housing 1026 configured to receive a substantial portion or all of the connector assembly 1024. The mounting bracket 1022 can include, without limitation, pins, hinges, connectors, or bracket elements. As shown in FIG. 41, all the components of the television mounting system 1020 can be positioned rearwardly away from an imaginary vertical plane 1030 extending along the front surface of the wall 120. The connector assembly 1024 can be or include an actuation apparatus (e.g., actuation apparatus 146 of FIG. 4), scissor assembly, collapsible arm assembly, etc.

Referring now to FIG. 42, a television mounting system 1040 can include a mounting assembly or bracket 1042 ("mounting bracket 1042"), a connector assembly 1044, and a television bracket 1046. The stowed television bracket 1046 can be completely received within an interior space 1060 of the mounting bracket 1042. The mounting system 1040 can include auxiliary components 1050 positioned within the interior space 1060. The auxiliary components 1050 can include, without limitation, controllers, wiring, counterbalancing mechanisms, biasing devices, linkages, or combinations thereof. In some embodiments, the back of the television 110 can contact and/or lie flush along the wall 120 and cover all or a portion of the opening of a housing 1066 of the mounting bracket 1042. The connector assembly 1044 can be or include an actuation apparatus (e.g., actuation apparatus 146 of FIG. 4), scissor assembly, collapsible arm assembly, etc.

The vertical positioner mechanisms, extender assemblies, dynamic components, and connector assemblies disclosed herein can be or include arms, linkage assemblies (e.g., two-bar linkages, three-bar linkages, four-bar linkages, five-bar linkages, etc.), swing arms, or the like. The brackets disclosed herein can include spacers, holders, sliders, rails, fasteners, stops, and/or other components that cooperate to facilitate mounting. The sizes, configurations, and functionality of the mounting brackets can be selected to provide a suitable appearance and positioning. For example, mounting brackets hidden within a wall can provide an aesthetically pleasing appearance and remain hidden when the television is in a lower position. A stationary movable plate or covering can extend across the opening or the bracket to keep components of the TV mount system obscured.

Motorized Mounting Systems

Figure 43:
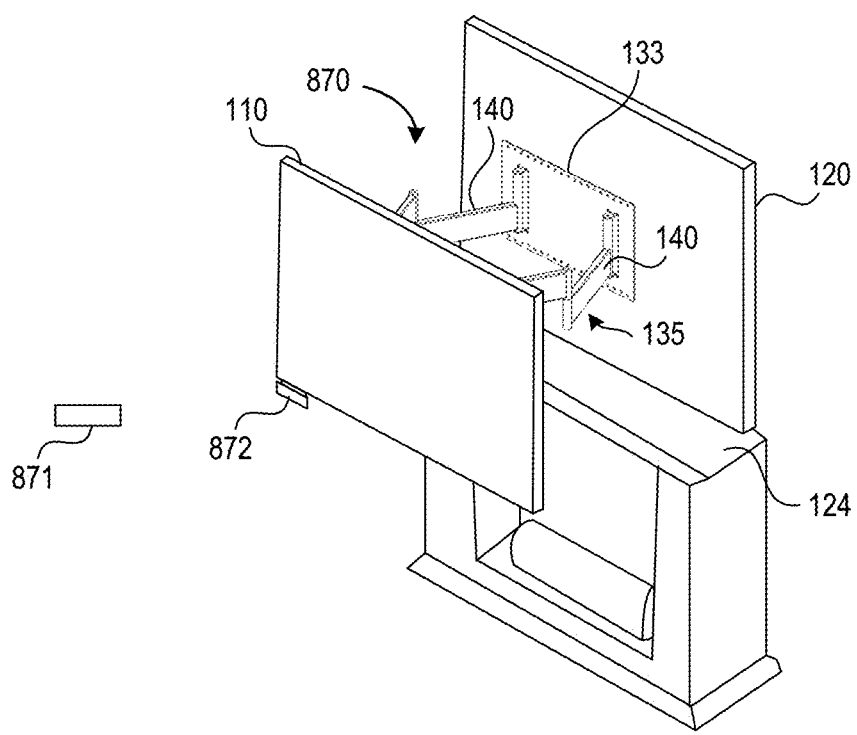
FIG. 43 shows a lowered television held by a motorized display mount in accordance with an embodiment of the technology.

FIG. 43 illustrates a motorized automated mounting system 870 that can be moved using a controller 871 that communicates with a control device/controller 872. The automated mounting system 870 can be any of the mounts disclosed herein and can include a motorized mount device that raises and lowers the television 110. The control device 872 can include a receiver that is communicatively coupled (e.g., wirelessly coupled, capacitively coupled, inductively coupled, or the like) to a transmitter of the controller 871. The control device 872 can store information in memory, and the stored information can include, but is not limited to, television position settings (e.g., height, tilt, etc.), the weight of the mounted object, or the like. Settings can include, but are not limited to, television positions (e.g., stowed positions, lowered positions, deployed positions, intermediate positions, or the like), gear settings, rotational relationship settings, schedules, motor settings, motor relationships, kinematic equations, or the like.

The controller 871 can be a wireless controller or remote with artificial intelligence functionality or other suitable functionality. For example, the controller 871 can include or be compatible with hubs or automation devices (e.g., Google Home, Amazon's Alexa, etc.), or other suitable devices for receiving input from users. Voice commands can be used to raise and lower the mounting system, set mounting system positions, program mounting systems, or the like. In some embodiments, the controller 871 can communicate wirelessly or via a wired connection with another device, such as an IoT hub or digital assistant (e.g., Google Home, Microsoft Cortana, Amazon Alexa, etc.). Wireless communication can be via a local network (e.g., WIFI network) or other suitable network. Additionally or alternatively, the controller 871 and/or control device 872 can communicate with a hub, router, or electronic controller, such as Google Home, Amazon Echo, or the like. In some embodiments, the mounting system 870 can be controlled with one or more voice commands, such as "Siri" (Apple), "Alexa" (Amazon), "Cortana" (Microsoft), Xbox, "OK Google" (Google), and so forth. A button on the controller 871 and/or control device 872 can be used to input/receive voice commands. The control device 872 can have one or more voice detectors (e.g., microphones) that operates to receive voice commands. The controller 871 and/or control device 872 can include one or more communication elements configured to communicate using a mesh network protocol, ZigBee® communication protocol, Z-Wave® communication protocol, wireless local area network, home wireless communication protocols, IoT protocols, or another communication protocol, such as 802.11.

The control device 872 can communicate directly with any number of communication devices and may include one or more sensors for detecting movement, position, temperatures, combinations thereof, or the like. By way of example, the control device 872 can include motion sensors configured to detect motion, such as gestures. Position sensors can be used to detect the position of obstacles. The control device 872 can have proximity sensors for detecting the position of viewers, motion, or the like. Viewer motion and position can be tracked to identify command gestures, positional information (e.g., optimum viewing positions), and so forth. In one embodiment, the control device 872 includes one or more cameras for determining the position of viewers, identifying objects, etc., and the control device 872 can determine the optimal display location using viewing algorithms. Identification software (e.g., facial recognition software) can be used to identify different people and to retrieve appropriate positions. Viewers can have different preferred positions stored in memory. In some embodiments, the control device 872 has an integrated controller, including the controller discussed in connection with FIG. 44.

Microphones can be used to receive audible information. The control device 872 can include a microphone and be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the wall mount system. Additionally or alternatively, the control device 872 can be programmed to move the display to various locations based upon, for example, the location of viewers, user-inputted settings, time settings, schedules, or voice commands. A timer can be used to determine when to automatically raise or lower the display. In some embodiments, authentication can be required to move the display. For example, the mounting system 870 can be actuated only when an authorization password or other identifier is provided. This way, children or other individuals cannot move the display.

Operation of the mounting system 870 can be coordinated with media content, including music, television shows, movies, video games, or other suitable media. In one mode of operation, the mounting system 870 can identify the start of the media (e.g., a movie, sports game, etc.) and can automatically position the display at a suitable viewing position. At the end of the content (e.g., completion of the movie, game, etc.), the mounting system 870 can automatically be raised to the stowed position. When one mounting system 870 is moved, it can send data to one or more other mounting systems. The data can include setting information, instructions, commands, or the like.

Mounting systems can be programmed to have coordinated operation. Each control device can have stored instructions and can communicate with each other via wired or wireless connections. In some embodiments, the mounting systems communicate with each other via a local network. Control devices can be programmed to move mounting systems according to one or more cycles or events. In commercial settings, mounting systems can periodically move to attract attention at, for example, a restaurant, a sports bar, or the like.

If the mounting system 870 is mounted above a mantelshelf, the control device 872 can be programmed to ensure that the mounting system does not strike the mantel (e.g., an upper surface of the mantelshelf) as a television is lowered downwardly past the mantelshelf. At a predetermined time (e.g., after a selected bedtime), the mounting system 870 can be automatically moved to the stowed configuration such that children cannot easily reach and pull on the television the next morning. In some embodiments, the mounting system 870 can be automatically returned to the stowed configuration after the television has been turned off for a certain period of time.

The control device 872 can be programmed to move the television to different positions, each having a different indicator (e.g., number, code, etc.). The indicator can be entered using the controller 871. Additionally or alternatively, the control device 872 can include input devices, such as a touch pad, a touch screen, a keyboard, or the like. A user can use the input device to move the mounting system 870 into different positions without utilizing any remote. If the control device 872 is hidden behind a television, the user can reach behind the television to access the control device 872 and position the television as desired. The controller 871 can be a phone (e.g., smartphone), tablet, computer, or other suitable electronic device for controlling motorized tilt mechanisms, motorized swivels, or other components. The components and features discussed in connection with FIG. 43 can be incorporated into any other mounts or systems disclosed herein.

Controllers

Figure 44:
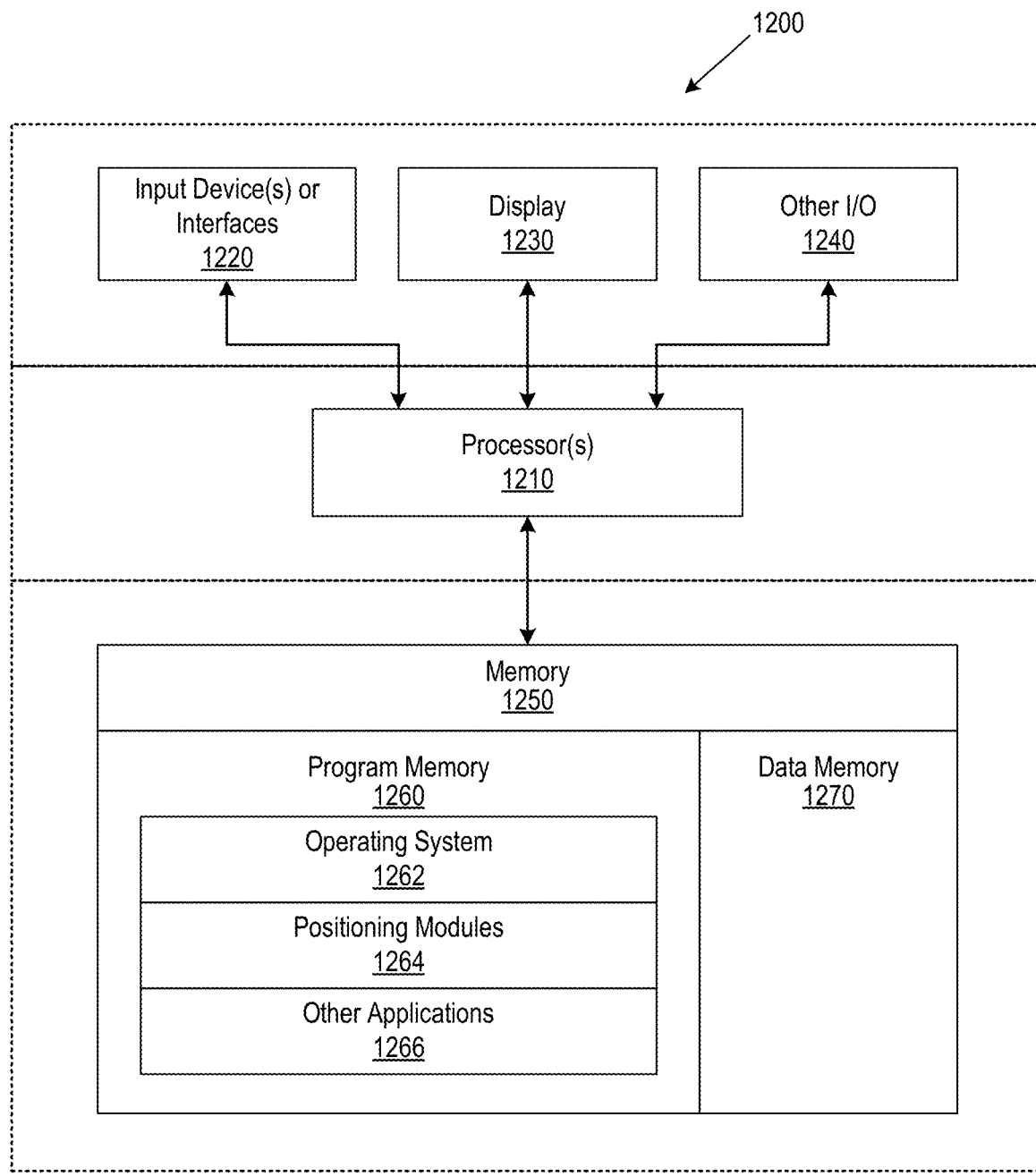
FIG. 44 shows a computing device in accordance with embodiments of the technology.

FIG. 44 illustrates a controller 1200 suitable for use in connection with mounts and systems disclosed herein, in accordance with select embodiments of the present technology. The controller 1200 can be used to control operation of mounts or can be incorporated in various components of computing devices or mounts, such as control devices (e.g., controller 506 of FIG. 17, controller 249 of FIG. 39, or control device 872 of FIG. 43). The controller 1200 can include one or more processors 1210 (e.g., CPU(s), GPU(s), HPU(s), etc.). The processor(s) 1210 can be a single processing unit or multiple processing units in a device or distributed across multiple components. The processor(s) 1210 can be coupled to other hardware devices, for example, with the use of a bus, such as a PCI bus or SCSI bus. The processor(s) 1210 can be configured to execute one or more computer-readable program instructions, such as program instructions to carry out any of the methods described herein.

The controller 1200 can include one or more input device(s) or interface(s) 1220 that provide input to the processor(s) 1210, for example, to notify it of actions from a user of the controller 1200. The actions can be mediated by a hardware controller that interprets the signals received from the input device and communicates the information to the processor(s) 1210 using a communication protocol. Input device(s) or interface(s) 1220 can include, for example, buttons, a keypad, a touchscreen, an audio input, a voice detector (e.g., microphone), a motion sensor, position sensors, a temperature sensor, a keyboard, a touchscreen, an infrared sensor, a port, a camera- or image-based input device, or other user input devices. If controller 1200 communicates with a wireless component, the input device(s) or interface(s) 1220 can be infrared interfaces, radio remote control interfaces, etc. For example, the controller 1200 can be in the form of an infrared wireless remote.

The controller 1200 can include a display 1230 used to display various types of output, such as television position settings, speed settings, range of motion, time, schedules, routines, network settings (e.g., wired network settings), etc. The processor(s) 1210 can communicate with the display 1230 via a hardware controller for devices. In some embodiments, the display 1230 includes the input device(s) 1220 as part of the display 1230, such as when the input device 1220 includes a touchscreen or is equipped with a motion monitoring system. In alternative embodiments, the display 1230 is separate from the input device(s) 1220. Examples of display devices include an LCD display screen, an LED display screen, and so on.

Optionally, other I/O devices 1240 can also be coupled to the processor(s) 910, such as a network card, a video card, an audio card, USB, firewire or other external devices, speakers, cameras, CD-ROM drive, DVD drives, disk drives, or Blu-Ray devices. In some embodiments, the I/O devices 1240 include one or more HDMI interfaces (e.g., HDMI-ARC port, mini-HDMI port, micro-HDMI port, dual-link HDMI port, etc.), optical interfaces, USB, USB-C, component port, S-video port, composite port, coaxial port, or combinations thereof. For example, the other I/O devices 1240 can be used to communicate with wired speakers (e.g., Sonos Beam, soundbars, etc.), streaming devices (e.g., streaming sticks, streaming hubs such as Apple TV, 4K streaming devices, etc.), audio receivers, sound systems, or the like. Other I/O devices 1240 can further include input ports for receiving data from other sources, such as smartphones, tablets, and/or computers using a wireless network to cast media. In some embodiments, the controller 1200 also includes a communication device (not shown) capable of communicating wirelessly or wire-based with a network node. The communication device can communicate with another device or a server through a network using, for example, TCP/IP protocols. The controller 1200 can utilize the communication device to distribute operations across multiple network devices, including IoT hubs, IoT bridges, cameras, etc.

The controller 1200 can include memory 1250, which can be in a single device or distributed across multiple devices. Memory 1250 includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware, a memory is thus non-transitory. In some embodiments, the memory 1250 is a non-transitory, computer-readable storage medium that stores, for example, programs, software, data, or the like. In some embodiments, memory 1250 can include program memory 1260 that stores programs and software, such as an operating system 1262, one or more positioning modules 1264, and other application programs 1266. The positioning modules 1264 can include one or more modules configured to perform the various methods described herein (e.g., move mounts, determine television characteristics, select user settings, manage data transfer between components, etc.). Memory 1250 can also include data memory 1270 that can include, for example, viewing algorithms, protocols (e.g., communication protocols, network protocols, etc.), configuration data (e.g., load capacities, etc.), libraries (e.g., voice recognition libraries), settings (e.g., manufacturer settings, user settings, trigger settings, event settings, etc.), voice recognition engines, user options or preferences, etc., which can be provided to the program memory 1260, positioning coordinates, control maps, or any other element of the controller 1200. For example, if the controller 1200 is voice-controlled, the data memory 1270 can store identification software and/or one or more voice data libraries used to identify voice commands, including wake commands. The controller 1200 can be configured to perform voice commands with or without connectivity to a remote server. In some embodiments, the data memory 1270 can include machine executable instructions for digital assistants, protocols for communicating with hubs, routers, etc.

The controller discussed herein can control the motors to reconfigure the mounting systems at various configurations. Positional relationships, motor parameters, position matrices, geometric relationships, or the like can be used by the motor to achieve the motion discussed herein. In some modes of operation, a user can input a desired television position. The controller 1200 can determine operational parameters for the motors to move the television to the set position. The controller 1200 can then command the motors to operate to move the TV along a path, at a desired speed, or the like. If the user wants to change how the TV is moved, the user can use the controller 1200 to adjust deployment of the mount. This allows user customization for the position of the television, motion of the television, and the path of travel. For example, controllers can include memory and at least one processor configured to execute instructions stored by the memory to enable the television to be lowered after the television has been laterally moved to or past a threshold lateral position (e.g., a predefined distance from a wall, set spacing from reference feature, etc.).

The mounts disclosed herein can include one or more sensors, including temperature elements. A temperature element can be located on the handle to display the ambient temperature. The temperature element can be proximate to the television to warn users if the temperature is too high for the television to safely operate. A means of setting a maximum extension prevents the television from extending beyond a point set by the user. In one embodiment, there is a radial thermometer, whereby a dial displays the current ambient temperature near the television to the user. In an alternative embodiment, there is a color changing temperature gauge. The color changing temperature gauge comprises a temperature-sensitive material that changes color depending upon the ambient temperature. This enables viewing of the current temperature from a distance. In yet another alternative, the temperature gauge is a digital thermometer with an LCD display. Temperature gauges, handles, and other components that can be incorporated into the systems and mounts disclosed herein are disclosed in U.S. Patent Application Publication No. 20120032062, which is incorporated by reference in its entirety. In some embodiments, the controller 1200 is in communication with a temperature element in the form of an electronic temperature sensor. If the temperature sensor detects the temperature at or above a user-set threshold, the controller 900 can cause an alert to be sent to a computing device, such as a user smartphone, tablet, or the like. The communication can be transmitted via a local network or a wide area network. If the user receives an alert, the user can adjust the position of the TV. In automatic setting modes, the controller 1200 can be programmed to automatically raise a TV when the temperature sensor measures a selected temperature. This allows the television 110 (FIG. 43) to be automatically moved to suitable operating positions independent of user operation.

Related Applications and Patents

Additional apparatuses, components, controllers, software, methods of operation, methods for manufacturing, and other features are disclosed in the following patents and applications: U.S. Patent Application No. 61/396,850; U.S. Pat. Nos. 8,724,037; 8,864,092; 8,724,037; 9,625,091; 9,876,984; 10,257,460; 10,277,860; U.S. Patent Application No. 61/913,195; U.S. Pat. Nos. 9,625,091; 10,281,080; U.S. patent application Ser. No. 16/033,972; U.S. patent application Ser. No. 16/370,854; U.S. patent application Ser. No.

16/924,551; U.S. patent application Ser. No. 17/026,088; U.S. patent application Ser. No. 16/375,835; U.S. patent application Ser. No. 17/090,701; U.S. Patent Application No. 62/553,961; U.S. Pat. No. 10,738,941; U.S. patent application Ser. No. 16/918,718; International Application No. PCT/US21/17141; U.S. Patent Application No. 62/950,524; U.S. Patent Application No. 62/972,643; and U.S. Patent Application No. 62/971,974. For example, cam mechanisms, tilting features, pivot features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. All patents, applications, and other references cited herein are hereby incorporated by reference in their entirety. Any and all priority claims identified in the Application Data Sheet, or any correction thereto, are also hereby incorporated by reference in their entirety.

Reference throughout this specification to "one embodiment" or "an embodiment" means that a particular feature, structure, or characteristic described in connection with the embodiment is included in at least one embodiment of the present invention. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

From the foregoing, it will be appreciated that specific embodiments of the invention have been described herein for purposes of illustration, but that various modifications may be made without deviating from the scope of the invention. Accordingly, the invention is not limited except as by the appended claims.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A television mount device, comprising:
   a wall mounting portion;
   a television mounting portion configured to carry a television;
   an extender assembly coupled to the wall mounting portion and configured to move the television mounting portion away from and toward a vertical wall to which the wall mounting portion is coupled; and
   a vertical positioner mechanism coupled to the extender assembly and configured to vertically move the television mounting portion independent of operation of the extender assembly and to move the television mounting portion lower than the wall mounting portion.
2. The television mount device of example 1, wherein the extender assembly and the vertical positioner mechanism are configured to allow the television mounting portion to be independently translated horizontally and vertically, respectively.
3. The television mount device of any of examples 1 and 2, wherein the extender assembly and the vertical positioner mechanism are operable to sequentially extend and lower the television to position at least a portion of the television mounting portion in front of a fireplace below the wall mounting portion.
4. The television mount device of any of examples 1-3, wherein the television mount device has a three-dimensional range of motion defining a television positioning envelope, wherein the television mounting portion translates in a direction parallel to a user applied force within the television positioning envelope.
5. The television mount device of any of examples 1-4, wherein the vertical positioner mechanism includes a user-activatable assist device configured to move the television to a preset viewing height.
6. The television mount device of any of examples 1-5, wherein the extender assembly is configured to translate the television mounting portion in a horizontal direction, and the vertical positioner mechanism is configured to translate the television mounting portion in a vertical direction.
7. The television mount device of any of examples 1-6, wherein the extender assembly holds the television mounting portion above a horizontal plane when the television mounting portion is at a rearward position near the vertical wall and at a forward position away from the vertical wall, wherein the vertical positioner mechanism is configured to move the television mounting portion in the forward position downwardly below the horizontal plane.
8. The television mount device of any of examples 1-7, wherein the extender assembly includes at least one linkage device configured to translate the television mounting portion horizontally away from the vertical wall, wherein the vertical positioner mechanism has a raised configuration for holding the television mounting portion at an elevated position and a lowered configuration for holding the television mounting portion below the wall mounting portion.
9. The television mount device of any of examples 1-8, wherein the extender assembly is reconfigurable to allow a user to manually pull the television away from the vertical wall, wherein the vertical positioner mechanism has a counterbalancing element that allows the television mounting portion to be manually pulled down after the television has been moved away from the vertical wall.
10. The television mount device of any of examples 1-9, wherein the extender assembly is configured to allow the television mounting portion to be moved in a first direction substantially parallel to a first plane, and wherein the vertical positioner mechanism is configured to allow the television mounting portion to be moved in a second direction substantially parallel to a second plane that is orthogonal to the first plane.
11. The television mount device of any of examples 1-10, wherein the extender assembly is configured to move the television mounting portion horizontally and the vertical positioner mechanism is configured move the television mounting portion vertically.

12. The television mount device of any of examples 1-11, wherein the vertical positioner mechanism has a raised position for holding at least a portion of the television mounting portion above a bottom of the wall mounting portion and a lowered position for holding a top of the television mounting portion lower than the wall mounting portion.
13. The television mount device of any of examples 1-12, wherein the vertical positioner mechanism includes one or more linear slides that extend to lower the television mounting portion.
14. The television mount device of any of examples 1-13, wherein the vertical positioner mechanism has an adjustable counterbalancing mechanism configured to counterbalance the television.
15. The television mount device of any of examples 1-14, wherein the extender assembly is configured for side-to-side lateral movement and swiveling of the television mounting portion about a vertical axis of rotation.
16. The television mount device of any of examples 1-15, wherein the extender assembly includes a pair of spaced apart folding arms rotatably coupled to the wall mounting portion and rotatably coupled to the television mounting portion.
17. The television mount device of any of examples 1-16, wherein the vertical positioner mechanism includes an adjustable counterbalancing device configured to counterbalance the vertically-translatable television carried by the television mounting portion.
18. The television mount device of any of examples 1-17, wherein the extender assembly and/or the vertical positioner mechanism is manually operated.
19. The television mount device of any of examples 1-18, wherein the extender assembly and/or the vertical positioner mechanism includes at least one motor that operates to move the television mounting portion.
20. The television mount device of any of examples 1-20 having a manual mode for manually moving the television and a motorized mode for robotically moving the television.
21. A display mount device, comprising:
a wall mounting portion;
a television mounting portion configured to couple to a television; and
a multidirectional actuation apparatus configured to allow independent linear translation of the television mounting portion in a plurality of directions when the wall mounting portion is mounted to a wall.
22. The display mount device of example 21, wherein the plurality of directions includes a horizontal direction and a vertical direction when the display mount device is mounted to the wall.
23. The display mount device of any of examples 21 and 22, wherein the multidirectional actuation apparatus has a three-dimensional range of motion defining a television positioning envelope, wherein the television mounting portion translates in a direction parallel to a user applied force within the television positioning envelope.
24. The display mount device of any of examples 21-23, wherein the multidirectional actuation apparatus includes
an extender assembly, and
a vertical positioner mechanism having a linear motion counterbalancing mechanism configured to counterbalance the television while the television is translated along a substantially linear path between a raised position and a lowered position.
25. The display mount device of example 24, wherein the counterbalancing mechanism is configured to provide a substantially constant counterbalancing force.
26. The display mount device of any of examples 24 and 25, wherein a percent change of a counterbalancing force is equal to or less than 10% for a predefined amount of television travel of the television.
27. The display mount device of any of examples 24-26, wherein the extender assembly is configured to move the television mounting portion between a rearward position and a forward position while the vertical positioner mechanism holds the television mounting portion at a raised position, wherein the vertical positioner mechanism is configured to move the television mounting portion between the raised position and the lowered position while the extender assembly holds the television mounting portion away from the rearward position.
28. The display mount device of any of examples 21-27 having a manual mode for manually moving the television and a motorized mode for automatically moving the television.
29. The display mount device of any of examples 21-28, further comprising an activation element operable to cause the television mount device in a motorized mode to vertically move the television in response to user input.
30. The display mount device of any of examples 21-29, further including a linear motion counterbalance mechanism that counterbalances the television manually movable along an axis, wherein the multidirectional actuation apparatus is configured to allow the counterbalanced television to be swiveled and/or tilted.
31. A television mount device, comprising:
a wall mounting portion;
a television mounting portion configured to couple to a television; and
an actuation apparatus configured to allow independent linear translation of the television mounting portion in a plurality of directions, wherein the actuation apparatus includes
a motorized positioner mechanism configured to be programmed with at least one target position, the motorized positioner mechanism including an activation element configured to be operated by a user to cause the motorized positioner mechanism to move the television to the at least one target position.
32. The television mount device of example 31, wherein the actuation apparatus is movable between a retracted configuration and an extended configuration, wherein the positioner mechanism vertically moves the television after the actuation apparatus has been moved from the retracted configuration to the extended configuration to move the television away from the wall mounting portion.
33. The television mount device of any of examples 31 and 32, wherein the actuation apparatus is configured to sequentially extend and lower the television to position at least a portion of the television in front of a fireplace.
34. The display mount device of any of examples 31-33, further comprising a controller including memory and at least one processor configured to execute instructions stored by the memory to perform actions including:
receiving the at least one target position from a user; and commanding the motorized positioner mechanism to move the television from a raised position to the at least one target position in response to user input provided via the activation element.

35. The television mount device of example 34, wherein the actions further includes:
receiving a plurality of target positions; and
commanding the motorized positioner mechanism to move the television to one of the plurality of target positions based on user input provided by the activation element associated with the one of the plurality target positions.

36. The television mount device of example 35 wherein the at least one target position is a plurality of target positions, and wherein each of the target positions of the plurality of target positions is user-selectable using the activation element.

37. The television mount device of any of examples 31-36, wherein the activation element includes one or more buttons, toggle switches, or depressible elements.

38. The television mount device of any of examples 31-37, wherein the actuation apparatus further includes an extender assembly collapsible independent of the operation of the motorized positioner mechanism.

39. The television mount device of any of examples 31-38, further comprising a controller including memory and at least one processor configured to execute instructions stored by the memory to enable the television to be lowered after the television has been laterally moved to or past a threshold lateral position.

40. A display mount device, comprising:
a fixed portion;
a television mounting portion configured to carry a television; and
a dynamic component coupled to the fixed portion and the television mounting portion, the dynamic portion having at least three independent degrees of freedom to translate the television mounting portion from a first position adjacent the fixed portion to a second position different from the first position.

41. The display mount device of example 40, wherein the at least three independent degrees of freedom include motion along a first horizontal axis, a second horizontal axis different from the first horizontal axis, and a vertical axis.

42. The display mount device of any of examples 40 and 41, wherein the at least three independent degrees of freedom include rotation about a horizontal axis.

43. The display mount device of any of examples 40-42, wherein the at least three independent degrees of freedom include rotation about a vertical axis.

44. The display mount device of any of examples 40-43, wherein the dynamic component provides at least five independent degrees of freedom.

45. The display mount device of any of examples 40-44, wherein the dynamic component includes:
an arm assembly providing at least two of the at least three independent degrees of freedom; and a vertical positioning mechanism providing at least one of the at least three independent degrees of freedom.

46. The display mount device of any of examples 40-45, wherein the dynamic component includes a bracket and a vertical positioning mechanism carried by the bracket, the vertical positioning mechanism including:
a lever having a first end rotatably carried by the bracket and a second end opposite the first end;
a compression component operably coupled to the second end of the lever, the compression component configured to counterbalance a weight of a television carried by the television mounting component;
an upper pulley assembly rotatably carried by the lever between the second end and the first end, the upper pulley assembly having a protruding portion extending laterally outwards from the upper pulley assembly a distance;
a lower pulley assembly carried by the bracket; and
a connector wrapped around the upper pulley assembly and the lower pulley assembly and coupled to the television mounting portion to lower the television mounting portion along a vertical axis, the connector wrapping over the protruding portion of the upper pulley assembly,
wherein the lever rotates to compress the compression component when the connector lowers the television mounting portion along the vertical axis, and
wherein the rotation of the lever reduces the distance the protruding portion extends laterally outwards from the upper pulley assembly.

47. The display mount device of any of examples 40-45, wherein the dynamic component includes a bracket and a vertical positioning mechanism carried by the bracket, the vertical positioning mechanism including:
a scissor assembly having a first end rotatably carried by the bracket and a second end rotatably connected to the television mounting portion, the scissor assembly positioned to expand to move the television mounting portion along a vertical axis;
a force bracket carried by the scissor assembly between the first end and the second end; and
a compression component having a first end rotatably carried by the bracket and a second end rotatably connected to the force bracket,
wherein the compression component is configured to counterbalance a weight of a television carried by the television mounting component,
wherein, the force bracket compresses the compression component when the scissor assembly expands, and
wherein the compression component at least partially rotates when the scissor assembly expands.

48. The display mount device of any of examples 40-45, wherein the dynamic component includes a bracket and a vertical positioning mechanism carried by the bracket, the vertical positioning mechanism including:
a scissor assembly having a first end rotatably carried by the bracket and a second end rotatably connected to the television mounting portion, the scissor assembly positioned to expand to move the television mounting portion along a vertical axis;
a force bracket having a first end rotatably carried by the bracket and a second end opposite the first end of the force bracket, wherein the force bracket is rotatably coupled to the scissor assembly between the first end of the force bracket and the second end of the force bracket; and
a compression component having a first end rotatably carried by the television mounting portion and a second end rotatably connected to the force bracket,
wherein the compression component is configured to counterbalance a weight of a television carried by the television mounting component
wherein, the force bracket compresses the compression component when the scissor assembly expands, and wherein the compression component at least partially rotates when the scissor assembly expands.

49. The display mount device of any of examples 40-45, wherein the dynamic component includes an arm assembly, the arm assembly including:
a scissor assembly having a first end carried by the fixed portion and a second end opposite the first end, the scissor assembly configured to expand in an arcuate path having a horizontal component and a vertical component; and
a pivot assembly carried by the second end of the scissor assembly, the pivot assembly providing at least one rotational degree of freedom to the dynamic component.

50. The display mount device of example 49, wherein the dynamic component further includes a vertical positioning mechanism coupled to the pivot assembly, the vertical positioning mechanism configured to move the television mounting portion along a vertical path.

51. The display mount device of any of examples 40-50, wherein the dynamic component is fully motorized, and wherein the dynamic component is in communication with a controller configured to actuate the dynamic component along each of the at least three independent degrees of freedom.

52. The display mount device of example 51, wherein the second position is a predefined position, and wherein the controller includes a memory storing instructions that when executed cause the controller to actuate the dynamic component into the predefined position different.

53. A display mount device, comprising:
a fixed mounting portion;
a television mounting portion configured to couple to a television; and
a dynamic component coupled to the fixed portion and the television mounting portion, the dynamic component including:
  a horizontal movement component configured to translate the television mounting portion in a direction along a horizontal plane;
  a rotational component configured to rotate the television mounting portion about at least one axis; and
  a vertical movement component configured to translate the television mounting portion along a vertical path.

54. The display mount device of example 53, wherein the horizontal movement component is configured to translate the television mounting portion independently along two axes within the horizontal plane.

55. The display mount device of any of examples 53 and 54, wherein the rotational component is configured to rotate the television mounting portion about a vertical axis allowing the dynamic component to direct the television mounting portion left or right about the vertical axis.

56. The display mount device of any of examples 53-55, wherein horizontal axis allowing the dynamic component to direct the television mounting portion up or down about the horizontal axis.

57. The display mount device of any of examples 53-55, wherein the vertical movement component is configured to counterbalance a weight of a television carried by the television mounting portion.

58. A television mount device, comprising:
a wall mounting portion;
a television mounting portion configured to carry a television;
actuation apparatus coupled to the wall mounting and including
  an extender assembly coupled to the wall mounting portion and configured to move the television mounting portion away from and toward a vertical wall to which the wall mounting portion is coupled, and
  a vertical positioner mechanism coupled to the extender assembly and configured to vertically move the television mounting portion independent of operation of the extender assembly and to move the television mounting portion lower than the wall mounting portion.

59. The television mount device of example 58, wherein the vertical positioner mechanism includes one or more linear slides.

60. The television mount device of any of examples 58 and 59, wherein the extender assembly includes at least one scissor assembly operable to linearly translate the television.

61. The television mount device of any of examples 58-60, wherein the extender assembly includes a pair of spaced apart folding arms rotatably coupled to the wall mounting portion and rotatably coupled to the television mounting portion.

62. The television mount device of any of examples 58-61, wherein the extender assembly and/or the vertical positioner mechanism is manually operated.

63. The television mount device of any of examples 58-62, wherein the extender assembly and/or the vertical positioner mechanism includes at least one motor that operates to move the television mounting portion.

64. The television mount device of any of examples 58-63 having a manual mode for manually moving the television and a motorized mode for automatically moving the television.

65. The television mount device of any of examples 58-64, further comprising a recessed housing configured to receive the actuation apparatus when the television mount device is collapsed.

66. The television mount device of any of examples 58-65, further comprising an auto-positioning device movable to contact one or more components of the television mount device to cause the television mounting portion and/or television to move toward a target position and/or orientation.

67. A display mount device, comprising:
a wall mounting bracket;
a television mounting bracket configured to couple to a television;
an actuation apparatus configured to allow independent linear translation of the television mounting bracket in a plurality of directions when the wall mounting portion is mounted to a wall; and
an auto-positioning device configured to cause the television mounting bracket and/or television to move toward a target position when the television is moved toward a stowed position.

68. The display mount device of example 67, wherein the auto-positioning device movable to contact one or more components of the display mount device to cause the television mounting bracket and/or television to move toward a target position and/or a target orientation.

69. The display mount device of any of examples 67 and 68, wherein the auto-positioning device moves the television mounting bracket and/or television to a user set orientation when moved toward the stowed position.
70. The display mount device of any of examples 67-69, wherein the auto-positioning device is configured to move the television mounting bracket and/or television to be generally parallel to the wall.
71. The display mount device of any of examples 67-70, wherein the auto-positioning device causes rotation of the television mounting bracket based on the television mounting bracket moving toward the stowed position.
72. The display mount device of any of examples 67-71, wherein the auto-positioning device allows the television mounting bracket and/or television to be swiveled and/or tilted when the television mounting bracket and/or television is at an extended position.
73. The display mount device of any of examples 67-72, wherein the auto-positioning device allows the television mounting bracket rotated about an axis after the auto-positioning device is disengaged.
74. The display mount device of any of examples 67-73, further including a recess housing configured to contain most of the display mount device when the display mount device is in a fully collapsed configuration.
75. The display mount device of any of examples 67-74, wherein the auto-positioning device includes a plurality of threaded position members rotatable to set the target position.

What is claimed is:

1. A television mount device, comprising:
a wall mounting portion configured to mount on a vertical wall;
a television mounting portion configured to carry a television;
an extender assembly coupled to the wall mounting portion and configured to move the television mounting portion away from and toward a vertical wall to which the wall mounting portion is coupled;
a vertical positioner mechanism including a telescoping assembly coupled to the television mounting portion, wherein the vertical positioner mechanism is pivotably coupled to the extender assembly by at least one pivot and configured to vertically move the television mounting portion independent of operation of the extender assembly and to move the television mounting portion lower than the wall mounting portion, and
wherein the vertical positioner mechanism comprises a counterbalancing mechanism coupled to the television mounting portion and configured to extend for adjusting the television mounting portion along a vertical axis.

2. The television mount device of claim 1, wherein the extender assembly and the vertical positioner mechanism are configured to allow the television mounting portion to be independently translated horizontally and vertically, respectively.

3. The television mount device of claim 1, wherein the extender assembly and the vertical positioner mechanism are operable to sequentially extend and lower the television to position at least a portion of the television mounting portion in front of a fireplace below the wall mounting portion.

4. The television mount device of claim 1, wherein the television mount device has a three-dimensional range of motion defining a television positioning envelope, wherein the television mounting portion translates in a direction parallel to a user applied force within the television positioning envelope.

5. The television mount device of claim 1, wherein the vertical positioner mechanism includes a user-activatable assist device configured to move the television to a preset viewing height.

6. The television mount device of claim 1, wherein the extender assembly is configured to translate the television mounting portion in a horizontal direction, and the vertical positioner mechanism is configured to translate the television mounting portion in a vertical direction.

7. The television mount device of claim 1, wherein the extender assembly holds the television mounting portion above a horizontal plane when the television mounting portion is at a rearward position near the vertical wall and at a forward position away from the vertical wall, wherein the vertical positioner mechanism is configured to move the television mounting portion in the forward position downwardly below the horizontal plane.

8. The television mount device of claim 1, wherein the extender assembly includes at least one linkage device configured to translate the television mounting portion horizontally away from the vertical wall, wherein the vertical positioner mechanism has a raised configuration for holding the television mounting portion at an elevated position and a lowered configuration for holding the television mounting portion below the wall mounting portion.

9. The television mount device of claim 1, wherein the extender assembly is reconfigurable to allow a user to manually pull the television away from the vertical wall, wherein the counterbalancing mechanism is configured to allow the television mounting portion to be manually pulled down after the television has been moved away from the vertical wall.

10. The television mount device of claim 1, wherein the extender assembly is configured to allow the television mounting portion to be moved in a first direction substantially parallel to a first plane, and wherein the vertical positioner mechanism is configured to allow the television mounting portion to be moved in a second direction substantially parallel to a second plane that is orthogonal to the first plane.

11. The television mount device of claim 1, wherein the vertical positioner mechanism has a raised position for holding at least a portion of the television mounting portion above a bottom of the wall mounting portion and a lowered position for holding a top of the television mounting portion lower than the wall mounting portion.

12. A television mount device, comprising:
a wall mounting portion configured to mount on a vertical wall;
a television mounting portion configured to carry a television;
an extender assembly coupled to the wall mounting portion and configured to move the television mounting portion away from and toward a vertical wall to which the wall mounting portion is coupled;
a vertical positioner mechanism carrying the television mounting portion and coupling the television mounting portion to the extender assembly, wherein the vertical positioner mechanism is pivotally coupled to the extender assembly and includes a telescoping assembly configured to extend independent of operation of the extender assembly to move the television mounting portion in a vertical direction lower than the wall mounting portion; and
wherein the vertical positioner mechanism comprises a counterbalancing mechanism, wherein the counterbalancing mechanism is coupled to the television mounting portion and extendable for vertically moving the television mounting portion along a generally vertical axis.

13. The television mount device of claim 12, wherein when the wall mounting portion is coupled to the vertical wall, the vertical positioner mechanism is configured to allow the television mounting portion to translate in a vertical direction, and the extender assembly is configured to translate the television mounting portion in a horizontal direction.

14. The television mount device of claim 12, wherein the vertical positioner mechanism is configured to be at least partially hidden by the television carried by the television mounting portion when the television mounting portion is lower than the wall mounting portion.

15. The television mount device of claim 12, wherein the vertical positioner mechanism includes a user-activated motorized assist device configured to move the television to a preset viewing height.

16. A television device, comprising:
   a wall mounting portion configured to mount on a vertical wall;
   a television mounting portion configured to carry a television;
   an extender assembly coupled to the wall mounting portion and configured to move the television mounting portion horizontally away from the wall mounting portion;
   a vertical positioner mechanism pivotally coupled to the extender assembly and including a telescoping assembly, wherein the telescoping assembly is configured to extend vertically to move the television mounting portion lower than the wall mounting portion, wherein vertical extension of the positioner mechanism is independent from operation of the extender assembly; and
   wherein the vertical positioner mechanism comprises a counterbalancing mechanism coupled to the television mounting portion and extendable to move the television mounting portion along a generally vertical axis.

17. The television mount device of claim 16, wherein the positioner mechanism includes a user-activated assist device configured to move the television to a user selected preset viewing height.

18. The television mount device of claim 16, wherein the television mount device has a three-dimensional range of motion defining a television positioning envelope, wherein the television mounting portion translates in a direction parallel to a user applied force within the television positioning envelope.

19. The television mount device of claim 16, wherein the extender assembly and the positioner mechanism are operable to sequentially extend and lower the television to position in response to a user applied force.

20. The television mount device of claim 16, wherein the extender assembly is reconfigurable to allow a user to manually pull the television away from the wall mounting portion, and wherein the counterbalancing mechanism is configured to allow the television mounting portion to be manually pulled down after the television has been moved away from the wall mounting portion, wherein the counterbalancing mechanism includes at least one of a flexible tether, cable, belt, chain, or scissors mechanism.

* * * * *